US012705622B1

(12) United States Patent
Jevans et al.

(10) Patent No.: US 12,705,622 B1
(45) **Date of Patent: *Aug. 11, 2026**

(54) SYSTEMS FOR TRACING MONERO TRANSACTION CHAINS USING ORDERING OF INPUTS AND OUTPUTS

(71) Applicant: CipherTrace, Inc., Menlo Park, CA (US)

(72) Inventors: David Alexander Jevans, Menlo Park, CA (US); Eric Downes, Seattle, WA (US); Alexander L. Mologoko, Dingmans Ferry, PA (US)

(73) Assignee: CipherTrace, Inc., Menlo Park, CA (US)

( * ) Notice: Subject to any disclaimer, the term of this patent is extended or adjusted under 35 U.S.C. 154(b) by 635 days.

This patent is subject to a terminal disclaimer.

(21) Appl. No.: 17/459,761

(22) Filed: Aug. 27, 2021

Related U.S. Application Data

(63) Continuation-in-part of application No. 17/393,089, filed on Aug. 3, 2021.

(Continued)

(51) Int. Cl.

| | |
|---|---|
| ***G06Q 20/40*** | (2012.01) |
| ***G06N 7/01*** | (2023.01) |
| ***G06Q 20/38*** | (2012.01) |

(52) U.S. Cl.
CPC ........... *G06Q 20/4016* (2013.01); *G06N 7/01* (2023.01); *G06Q 20/3825* (2013.01); (Continued)

(58) Field of Classification Search
CPC ... G06Q 20/4016; G06Q 20/3825; G06N 7/01
See application file for complete search history.

(56) References Cited

U.S. PATENT DOCUMENTS 9,047,423 B2 6/2015 Tesauro et al.
9,298,806 B1 3/2016 Vessenes et al.
(Continued)

FOREIGN PATENT DOCUMENTS

CN 104320262 A 1/2015
CN 110349025 A * 10/2019 ............ G06F 21/64
(Continued)

OTHER PUBLICATIONS

Moser et al: "An Empirical Analysis of Traceability in the Monero Blockchain", Apr. 23, 2018 https://arxiv.org/pdf/1704.04299v4.*
(Continued)

*Primary Examiner* — Courtney P Jones
*Assistant Examiner* — Davida Lee King
(74) *Attorney, Agent, or Firm* — Barta Jones, PLLC

(57) ABSTRACT

Embodiments include systems and methods for searching, tracing, and tracking Monero transaction chains. An exemplary method includes receiving, at a user interface using a plurality of Monero transaction menus, Monero transaction identification data for searching, tracing, and tracking Monero transaction chains. The method also includes determining, at the server computing device, an input of the Monero transaction identification data and an output of the Monero transaction identification data. The method also includes analyzing, at the server computing device, the input of the Monero transaction identification data determining a ring signature of the input of the Monero transaction identification data, the ring signature may include a plurality of decoys and a spendable and valid input. The method also includes generating, with a processor, a user interface displaying the plurality of decoys and the spendable and valid input.

19 Claims, 13 Drawing Sheets

Related U.S. Application Data

(60) Provisional application No. 63/072,230, filed on Aug. 30, 2020.

(52) U.S. Cl.
CPC ....... *G06Q 20/389* (2013.01); *G06Q 20/4014* (2013.01); *G06Q 2220/00* (2013.01)

(56) References Cited

U.S. PATENT DOCUMENTS 9,635,000 B1 4/2017 Muftic
10,102,265 B1 10/2018 Madisetti et al.
10,171,476 B2 1/2019 Khan
10,354,325 B1 * 7/2019 Skala .................. G06Q 20/065
10,891,694 B1 1/2021 Leise et al.
11,062,280 B1 * 7/2021 Blankstein ............ G06F 11/184
11,206,137 B2 12/2021 Yu et al.
11,238,447 B2 * 2/2022 Zhang ................ G06Q 20/3829
11,251,937 B2 2/2022 Jevans
2006/0184528 A1 8/2006 Rodeh
2006/0248016 A1 11/2006 Ginter et al.
2011/0251951 A1 10/2011 Kolkowitz et al.
2012/0130853 A1 5/2012 Petri
2013/0018796 A1 1/2013 Kolhatkar et al.
2014/0047544 A1 2/2014 Jakobsson
2015/0032625 A1 1/2015 Dill et al.
2015/0318995 A1 11/2015 Leggette et al.
2015/0332283 A1 11/2015 Witchey
2015/0363769 A1 12/2015 Ronca
2015/0381637 A1 12/2015 Raff et al.
2016/0012222 A1 * 1/2016 Stolfo ................. H04L 63/1466 726/23
2016/0012465 A1 1/2016 Sharp
2016/0071108 A1 3/2016 Caldera et al.
2016/0217436 A1 7/2016 Brama
2016/0261690 A1 9/2016 Ford
2016/0283920 A1 9/2016 Fisher et al.
2016/0283941 A1 9/2016 Andrade
2016/0300227 A1 10/2016 Subhedar et al.
2016/0300234 A1 10/2016 Moss-Pultz et al.
2016/0330027 A1 11/2016 Ebrahimi
2016/0342994 A1 11/2016 Davis
2017/0005804 A1 1/2017 Zinder
2017/0011460 A1 1/2017 Molinari et al.
2017/0031676 A1 2/2017 Cecchetti et al.
2017/0034197 A1 2/2017 Daniel et al.
2017/0093830 A1 3/2017 Wuehler
2017/0111175 A1 4/2017 Oberhauser et al.
2017/0132620 A1 5/2017 Miller et al.
2017/0132635 A1 5/2017 Caldera
2017/0132636 A1 5/2017 Caldera
2017/0206604 A1 7/2017 Al-Masoud
2017/0214701 A1 7/2017 Hasan
2017/0236094 A1 8/2017 Shah
2017/0250972 A1 8/2017 Ronda et al.
2017/0270534 A1 9/2017 Zoldi et al.
2017/0293669 A1 10/2017 Madhavan et al.
2017/0315744 A1 * 11/2017 Kurian .................... G06F 21/62
2017/0316390 A1 11/2017 Smith et al.
2017/0330180 A1 11/2017 Song et al.
2017/0344988 A1 11/2017 Cusden et al.
2017/0352116 A1 12/2017 Pierce et al.
2017/0366348 A1 12/2017 Weimer et al.
2018/0006826 A1 1/2018 Smith et al.
2018/0018723 A1 1/2018 Nagla et al.
2018/0039667 A1 2/2018 Pierce et al.
2018/0082256 A1 3/2018 Tummuru et al.
2018/0089256 A1 3/2018 Wright, Sr.
2018/0109541 A1 4/2018 Gleichauf
2018/0137306 A1 5/2018 Brady et al.
2018/0183606 A1 6/2018 High et al.
2018/0211038 A1 7/2018 Breiman et al.
2018/0219671 A1 8/2018 Velissarios et al.
2018/0240107 A1 8/2018 Andrade
2018/0245877 A1 8/2018 Lee
2018/0253702 A1 9/2018 Dowding
2018/0276666 A1 9/2018 Haldenby et al.
2018/0285879 A1 10/2018 Gadnis et al.
2018/0330385 A1 11/2018 Johnson et al.
2018/0331835 A1 11/2018 Jackson
2019/0018888 A1 1/2019 Madisetti et al.
2019/0057362 A1 2/2019 Wright
2019/0081961 A1 3/2019 Bansal
2019/0129916 A1 5/2019 Hidaka et al.
2019/0132350 A1 5/2019 Smith et al.
2019/0156301 A1 5/2019 Bentov et al.
2019/0164156 A1 5/2019 Lindemann
2019/0196899 A1 6/2019 Sylvester et al.
2019/0199535 A1 6/2019 Falk
2019/0229892 A1 7/2019 Jevans
2019/0245699 A1 8/2019 Irwan et al.
2019/0245877 A1 * 8/2019 Toth .................... H04L 63/1425
2019/0279215 A1 9/2019 Kuchar
2019/0354725 A1 11/2019 Lowagie
2019/0370797 A1 12/2019 Jevans et al.
2020/0160344 A1 5/2020 Jevans et al.
2020/0162485 A1 5/2020 Jevans et al.
2020/0167779 A1 5/2020 Carver et al.
2020/0202345 A1 6/2020 Zhang et al.
2020/0210386 A1 7/2020 Quick et al.
2020/0213130 A1 7/2020 Zhang
2020/0228317 A1 * 7/2020 Ma .......................... G06F 21/10
2020/0351278 A9 11/2020 Jevans et al.
2020/0364042 A1 11/2020 Wuensche
2021/0006399 A1 1/2021 Lee
2021/0051176 A1 * 2/2021 Stolfo ................. H04L 63/1491
2021/0075592 A1 3/2021 Zhuo
2021/0089676 A1 * 3/2021 Ford ..................... H04L 9/0825
2021/0110382 A1 * 4/2021 Walters .............. G06Q 20/3823
2021/0166218 A1 * 6/2021 Moiyallah, Jr. .... G06Q 20/3674
2023/0107852 A1 4/2023 Akagi et al.

FOREIGN PATENT DOCUMENTS

CN 112836974 A * 5/2021 ............. G06N 3/045
CN 112884968 5/2022
EP 3884411 A1 9/2021
EP 3884441 A1 9/2021
GB 2593647 A1 9/2021
GB 2594396 A1 10/2021
WO 2016210156 12/2016
WO WO2019071458 A1 4/2019
WO WO2019144042 A1 7/2019
WO WO2019231772 A1 12/2019
WO WO2020010279 A1 1/2020
WO WO2020106638 A1 5/2020
WO WO2020106639 A1 5/2020
WO 2020120933 A1 6/2020
WO 2021070247 4/2021
WO WO-2021081803 A1 * 5/2021

OTHER PUBLICATIONS

Sun et al: "BitVis: An Interactive Visualization System for Bitcoin Accounts Analysis", 2019 https://ieeexplore.ieee.org/stamp/stamp.jsp?tp=&arnumber=8787562.*

Biryukov, A., Khovratovich, D., and Pustogarov, I. Deanonymisation of clients in Bitcoin P2P network. In Proceedings of the 2014 ACM SIGSAC Conference on Computer and Communications Security (2014), ACM, pp. 15-29., 15 pages.

M. Fleder, M. S. Kester, S. Pillal, Bitcoin Transaction Graph Analysis, CoRR, vol. abs/1502.01657, 2015, [online] Available: http://arxiv.org/abs/1502.01657, 8 pages.

M. Moser, R. Bohme, D. Breuker, "An inquiry into money laundering tools in the Bitcoin ecosystem", IEEE eCrime Researchers Summit (eCRS), 2013, 14 pages.

S. Meiklejohn, M. Pomarole, G. Jordan, K. Levchenko, D. McCoy, G. M. Voelker, S. Savage, "A Fistful of Bitcoins: Characterizing Payments Among Men with No Names", IMC, 2013, 13 pages.

(56) References Cited

OTHER PUBLICATIONS

F. Reid and M. Harrigan, “An analysis of anonymity in the Bitcoin system,” in Privacy, security, risk and trust (PASSAT), 2011 IEEE Third Internatiojn Conference on Social Computing (SOCIALCOM). IEEE, 2011, pp. 1318-1326.

“International Search Report” and “Written Opinion of the International Searching Authority,” Patent Cooperation Treaty Application No. PCT/US2019/014346, Apr. 22, 2019, 6 pages.

“International Search Report” and “Written Opinion of the International Searching Authority,” Patent Cooperation Treaty Application No. PCT/US2019/033399, Aug. 1, 2019, 8 pages.

Chaum, David Lee, “Computer Systems Established, Maintained, and Trusted by Mutually Suspicious Groups,” Dissertation, Department of Computer Science, University of California, Berkeley, May 22, 1982, 96 pages.

“International Search Report” and “Written Opinion of the International Searching Authority,” Patent Cooperation Treaty Application No. PCT/US2019/062047, Jan. 24, 2020, 13 pages.

“International Search Report” and “Written Opinion of the International Searching Authority,” Patent Cooperation Treaty Application No. PCT/US2019/062049, Jan. 27, 2020, 10 pages,.

Kharraz Amin et al., “Cutting the Gordian Knot: A Look under the Hood of Ransomware Attacks”; International Conference on Detection of Intrusions and Malware, and Vulnerability Assessment, Jun. 23, 2015 [retrieved Jan. 5, 2020]; Retrieved from the internet: <http://193.55.114.1/docs/dimva15_ransomware.pdf>, 28 pages.

Ye et al., “Alt-Coin Traceability,” May 18, 2020 [retrieved May 25, 2021]; Retrieved from the internet: <https://eprint.lacr.org/2020/593>, 24 pages.

Van Saberhagen, “CryptoNote v 2.0,” Oct. 17, 2013 [retrieved May 25, 2021]; Retrieved from the internet: <https://www.google.com/url?sa=t&rct=j&q=&esrc=s&source=web&cd=&ved=2ahUKEwjKnqCY1eXwAhUFCjQIHXcOD_4QFjAAegQIAxAD&url=https%3A%2F%2Fbytecoin.org%2Fold%2Fwhitepaper.pdf&usg=AOWVaw2WPuLQEPBjsZIPvUdROfmW>, 20 pages.

Biryukov et al., “Deanonymisation of clients in Bitcoin P2P network,” Jul. 5, 2014, [retrieved May 25, 2021]; Retrieved from the internet: <https://arxiv.org/abs/1405.74183>, 15 p.

Fleder et al., “Bitcoin Transaction Graph Analysis,” Feb. 5, 2015 [retrieved May 25, 2021]; Retrieved from the internet: <https://arxiv.org/abs/1502.01657>, 8 pages.

Möser et al., “An Inquiry into Money Laundering Tools in the Bitcoin Ecosystem,” 2013 [retrieved May 25, 2021]; Retrieved from the internet: <https://www.google.com/url?sa=t&rct=j&q=&esrc=s&source=web&cd=&ved=2ahUKEwjbnrXL1uXwAhU3JjQIHZDLCv0QFjADegQICBAD&url=https%3A%2F%2Fmaltemoeser.de%2Fpaper%2Fmoney-laundering.pdf&usg=AOWVaw0ta6LuCqsYGaknzINjyRsD>, 14 pages.

Meiklejohn et al., “A Fistful of Bitcoins: Characterizing Payments Among Men with No Names,” 2013 [retrieved May 25, 2021]; Retrieved from the internet: <https://www.google.com/url?sa=t&rct=j&q=&esrc=s&source=web&cd=&ved=2ahUKEwjahNq11-XwAhUKGDQIHecoC_0QFjACegQIAxAD&url=https%3A%2F%2Fcseweb.ucsd.edu%2F~smeiklejohn%2Ffiles%2Fimc13.pdf&usg=AOvVaw19IMVZQrG6hey605n-ftFH>. 13 pages.

Reid et al., “An Analysis of Anonymity in the Bitcoin System,” Jul. 22, 2011 [retrieved May 25, 2021]; Retrieved from the internet: <https://arxiv.org/abs/1107.4524>, 30 pages.

Welsh, Noel, “Bandit Algorithms ContinuedL UCB1,” Nov. 9, 2010; 17 pages.

J2kun, “Optimism in the Face of Uncertainty: the UCB1 Algorithm,” [online] Oct. 28, 2013 [retrieved Jun. 9, 2021]; Retrieved from the internet: <https://jeremykun.com/2013/10/28/optimism-in-the-face-of-uncertainty-the-ucb1-algorithm/>, 17 pages.

Prasad, Aditya, “Lessons From Implementing AlphaZero,” [online] Jun. 5, 2018 [retrieved Jun. 9, 2021]; Retrieved from the internet: <https://medium.com/oracledevs/lessons-from-implementing-alphazero-7e36e9054191>, 4 pages.

Chaum, D., “Blind signatures for untraceable payments” in Chaum D., Rivest R.L., Sherman A.T. (eds) Advances in Cryptology Proceedings of Crypto 82, 1983, pp. 199-203.

* cited by examiner

∨Memory Quota

Memory Quota 305

| Pod | Memory Usage | Memory Requests | Memory Requests % | Memory Limits | Memory Limits % |
|---|---|---|---|---|---|
| monero-ingest-consumer-0 | 837.57 MiB | 24.00 GiB | 3.41% | 24.00 GiB | 3.41% |
| monero-ingest-consumer-2 | 844.24 MiB | 24.00 GiB | 3.44% | 24.00 GiB | 3.44% |
| monero-ingest-consumer-1 | 832.01 MiB | 24.00 GiB | 3.39% | 24.00 GiB | 3.39% |
| monero-ingest-consumer-3 | 846.50 MB | 24.00 GiB | 3.44% | 24.00 GiB | 3.44% |

∨Network

Current Network Usage 310

| Pod | Current Receive Bandwidth | Current Transmit Bandwidth | Rate of Received Packets | Rate of Transmitted Packets | Rate of Received Packets Dropped | Rate of Transmitted Packets Dropped |
|---|---|---|---|---|---|---|
| monero-ingest-consumer-0 | 20.05 kBs | 43.23 kBs | 93.23 pps | 116.31 pps | 0 pps | 0 pps |
| monero-ingest-consumer-2 | 28.18 kBs | 51.89 kBs | 115.15 pps | 147.86 pps | 0 pps | 0 pps |
| monero-ingest-consumer-1 | 29.31 kBs | 59.33 kBs | 122.68 pps | 165.84 pps | 0 pps | 0 pps |
| monero-ingest-consumer-3 | 44.31 kBs | 89.71 kBs | 180.37 pps | 215.84 pps | 0 pps | 0 pps |

∨Network

Receive Bandwidth 315

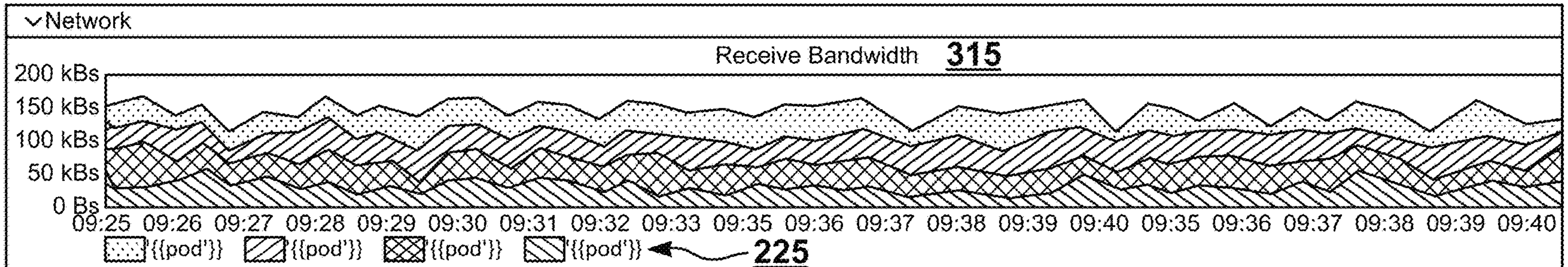

∨Network

Transmit Bandwidth 320

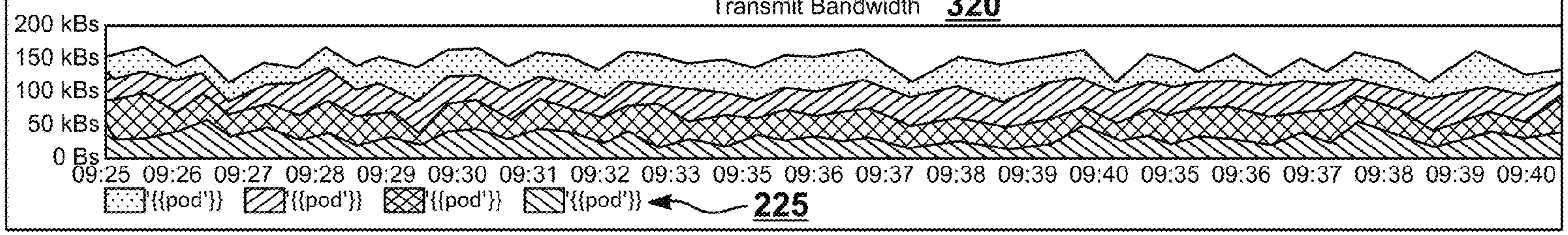

FIG. 3

SYSTEMS FOR TRACING MONERO TRANSACTION CHAINS USING ORDERING OF INPUTS AND OUTPUTS

CROSS REFERENCE TO RELATED APPLICATIONS

This application is a continuation-in-part of U.S. patent application Ser. No. 17/393,089, filed on Aug. 3, 2021, which claims the priority benefit of U.S. Provisional Patent Application Ser. No. 63/072,230 filed on Aug. 30, 2020. All of the aforementioned disclosures are hereby incorporated by reference in their entireties including all references cited therein.

STATEMENT REGARDING FEDERALLY SPONSORED RESEARCH OR DEVELOPMENT

This invention was made with government support under 140D7018C0008, awarded by Department of Homeland Security. Accordingly, the United States government may have certain rights in this invention.

FIELD OF THE TECHNOLOGY

Embodiments of the disclosure relate to tracing cryptocurrencies. In particular, the present disclosure relates to monitoring, searching, tracking, and tracing Monero transaction chains.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Virtual currencies, or cryptocurrencies, are becoming widespread across the globe. Cryptocurrencies were invented in 1983 with the seminal whitepaper from David Chaum describing how cryptography could be used to transfer measures of value between persons over computer networks. (See David Chaum. Blind signatures for untraceable payments. In D. Chaum, R. L. Rivest, and A. T. Sherman, editors, Advances in Cryptology Proceedings of Crypto 82, pages 199-203, 1983.)

In 2009, the Bitcoin protocol and ideology was introduced. This electronic currency took hold and has expanded into a global phenomenon. While there are countless legitimate uses for cryptocurrencies, cybercriminals are capitalizing on the decentralization and anonymization offered by digital currencies. Anonymity or "pseudonymity," coupled with the rapid and irreversible ability to transfer funds, facilitates financially-driven criminal activities, including money laundering, ransomware, extortion, drug trafficking, and live-streams for illicit internet site-especially those engaged in child sexual exploitation. Criminals are capitalizing on the decentralization and anonymous payment mechanisms of virtual currencies, thus, posing serious challenges for law enforcement efforts to recognize, analyze, trace criminal activity, and seize their profits. For example, Monero (XMR) is a decentralized cryptocurrency that uses a public distributed ledger with privacy-enhancing technologies that obfuscate transactions to achieve anonymity and fungibility. Monero is designed so observers cannot decipher addresses trading Monero, transaction amounts, address balances, or transaction histories. The privacy features of Monero have attracted users desiring privacy measures not provided by other cryptocurrencies. Moreover, Monero is increasingly used in illicit activities such as money laundering, darknet markets, ransomware, and "crypto jacking." Thus, there is a need by law enforcement, regulators, and the intelligence community for forensic technologies to understand how virtual currencies operate, to monitor and track criminal activities that use cryptocurrency systems, and to assist in the deanonymization of Monero transaction chains.

SUMMARY

According to some embodiments, the present technology is directed to a system of one or more computers that may be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some aspects, the techniques described herein relate to a computer program product including a non-transitory computer useable storage device having a computer readable program, wherein the computer readable program when executed on a server computing device causes the server computing device to: deploy, using the server computing device, a Monero node to a Monero network, the Monero node receiving and sending Monero network transactions from the Monero network; monitor, using the Monero node, Monero network transaction chain data on the Monero network based on the receiving and sending Monero network transactions by the Monero node, the Monero network transaction chain data including input data and output data of Monero network transactions; generate, with a processor, a user interface having a plurality of Monero transaction menus; receive, at the user interface using the plurality of Monero transaction menus, Monero transaction identification data for searching, tracing, and tracking Monero transaction chains; determine, at the server computing device, a plurality of inputs of the Monero transaction identification data and a plurality of outputs of the Monero transaction identification data; order, using the server computing device, the plurality of inputs of the Monero transaction identification data and the plurality of outputs of the Monero transaction identification data; store, using the server computing device and the order, the plurality of inputs of the Monero transaction identification data and the plurality of outputs of the Monero transaction identification data; analyze, at the server computing device, the plurality of inputs of the Monero transaction identification data determining a ring signature of an input of the plurality of inputs of Monero transaction identification data, the ring signature including a plurality of decoys and a spendable and valid input; and generate, with a processor, a user interface displaying the plurality of decoys and the spendable and valid input.

In some aspects, the techniques described herein relate to a computer program product, wherein the order, using the server computing device, the plurality of inputs of the Monero transaction identification data and the plurality of outputs of the Monero transaction identification data includes placing the plurality of outputs of the Monero transaction identification data before the plurality of inputs of the Monero transaction identification data.

In some aspects, the techniques described herein relate to a computer program product, wherein the store, using the server computing device, the plurality of inputs of the Monero transaction identification data and the plurality of outputs of the Monero transaction identification data uses a bit array with one bit per potential state.

In some aspects, the techniques described herein relate to a computer program product, wherein the server computing device is further caused to analyze, using the Monero network transaction chain data, the plurality of decoys for determining a decoy probability for each decoy of the plurality of decoys, the decoy probability being a probability that a decoy is the spendable and valid input and not a decoy input.

In some aspects, the techniques described herein relate to a computer program product, wherein the determining the decoy probability for each decoy of the plurality of decoys includes: non-deterministic algorithms based on random simulation.

In some aspects, the techniques described herein relate to a computer program product, wherein the determining the decoy probability for each decoy of the plurality of decoys includes: using optimization algorithms on a Bayesian Network.

In some aspects, the techniques described herein relate to a computer program product, wherein the server computing device is further caused to generate, with a processor, a user interface displaying the plurality of decoys and the decoy probability for each decoy of the plurality of decoys for an end user to determine the spendable and valid input.

In some aspects, the techniques described herein relate to a computer program product, wherein the server computing device is further caused to receive, at the user interface, user input data indicating the Monero transaction identification data for searching, tracing, and tracking Monero transaction chains was used in an illegal transaction.

In some aspects, the techniques described herein relate to a computer program product, wherein the server computing device is further caused to send the user input data indicating the Monero transaction identification data for searching, tracing, and tracking Monero transaction chains was used in an illegal transaction to a Monero related Virtual Asset Service Provider (VASP).

In some aspects, the techniques described herein relate to a computer program product including a non-transitory computer useable storage device having a computer readable program, wherein the computer readable program when executed on a server computing device causes the server computing device to: receive, using the server computing device, Monero network transactions from a Monero node, the Monero node being a third-party Monero node; monitor, using the Monero node, Monero network transaction chain data on the Monero network based on the Monero network transactions from the Monero node, the Monero network transaction chain data including input data and output data of Monero network transactions; generate, with a processor, a user interface having a plurality of Monero transaction menus; receive, at the user interface using the plurality of Monero transaction menus, Monero transaction identification data for searching, tracing, and tracking Monero transaction chains; determine, at the server computing device, an input of the Monero transaction identification data and an output of the Monero transaction identification data; order, using the server computing device, the plurality of inputs of the Monero transaction identification data and the plurality of outputs of the Monero transaction identification data; store, using the server computing device and the order, the plurality of inputs of the Monero transaction identification data and the plurality of outputs of the Monero transaction identification data; analyze, at the server computing device, the input of the Monero transaction identification data determining a ring signature of the input of the Monero transaction identification data, the ring signature including a plurality of decoys and a spendable and valid input; analyze, using the Monero network transaction chain data, the plurality of decoys for determining a decoy probability for each decoy of the plurality of decoys, the decoy probability being a probability that a decoy is the spendable and valid input and not a decoy input; and generate, with a processor, a user interface displaying the plurality of decoys, the decoy probability for each decoy of the plurality of decoys, and the spendable and valid input.

In some aspects, the techniques described herein relate to a computer program product including a non-transitory computer useable storage device having a computer readable program, wherein the computer readable program when executed on a server computing device causes the server computing device to: receive, using the server computing device, Monero network transactions from a Monero network; monitor, using the server computing device, Monero network transaction chain data on the Monero network based on the Monero network transactions, the Monero network transaction chain data including input data and output data of Monero network transactions; generate, with a processor, a user interface having a plurality of Monero transaction menus; receive, at the user interface using the plurality of Monero transaction menus, Monero transaction identification data for searching, tracing, and tracking Monero transaction chains; determine, at the server computing device, an input of the Monero transaction identification data and an output of the Monero transaction identification data; order, using the server computing device, the plurality of inputs of the Monero transaction identification data and the plurality of outputs of the Monero transaction identification data; store, using the server computing device and the order, the plurality of inputs of the Monero transaction identification data and the plurality of outputs of the Monero transaction identification data; analyze, at the server computing device, the input of the Monero transaction identification data determining a ring signature of the input of the Monero transaction identification data, the ring signature including a plurality of decoys and a spendable and valid input; analyze, using the Monero network transaction chain data, the plurality of decoys for determining a decoy probability for each decoy of the plurality of decoys, the decoy probability being a probability that a decoy is the spendable and valid input and not a decoy input; and generate, with a processor, a user interface displaying the plurality of decoys, the decoy probability for each decoy of the plurality of decoys, and the spendable and valid input.

In some aspects, the techniques described herein relate to a computer implemented method for searching, tracing, and tracking Monero transaction chains including: deploying, using a server computing device, a Monero node to a Monero network, the Monero node receiving and sending Monero network transactions from the Monero network; monitoring, using the Monero node, Monero network transaction chain data on the Monero network based on the receiving and sending Monero network transactions by the Monero node, the Monero network transaction chain data including input data and output data of Monero network transactions; generating, with a processor, a user interface having a plurality of Monero transaction menus; receiving, at the user interface using the plurality of Monero transaction menus, Monero transaction identification data for searching, tracing, and tracking Monero transaction chains; determining, at the server computing device, an input of the Monero transaction identification data and an output of the Monero transaction identification data; ordering, using the server computing device, the plurality of inputs of the Monero transaction identification data and the plurality of outputs of the Monero transaction identification data; storing, using the server computing device and the order, the plurality of inputs of the Monero transaction identification data and the plurality of outputs of the Monero transaction identification data; analyzing, at the server computing device, the input of the Monero transaction identification data determining a ring signature of the input of the Monero transaction identification data, the ring signature including a plurality of decoys and a spendable and valid input, the analyzing including; and generating, with a processor, a user interface displaying the plurality of decoys and the spendable and valid input.

In some aspects, the techniques described herein relate to a computer implemented method, wherein the ordering, using the server computing device, the plurality of inputs of the Monero transaction identification data and the plurality of outputs of the Monero transaction identification data includes placing the plurality of outputs of the Monero transaction identification data before the plurality of inputs of the Monero transaction identification data.

In some aspects, the techniques described herein relate to a computer implemented method, wherein the storing, using the server computing device, the plurality of inputs of the Monero transaction identification data and the plurality of outputs of the Monero transaction identification data uses a bit array with one bit per potential state.

In some aspects, the techniques described herein relate to a computer implemented method, further including analyzing, using the Monero network transaction chain data, the plurality of decoys for determining a decoy probability for each decoy of the plurality of decoys, the decoy probability being a probability that a decoy is the spendable and valid input and not a decoy input.

In some aspects, the techniques described herein relate to a computer implemented method, wherein the determining the decoy probability for each decoy of the plurality of decoys includes: non-deterministic algorithms based on random simulation.

In some aspects, the techniques described herein relate to a computer implemented method, wherein the determining the decoy probability for each decoy of the plurality of decoys includes: using optimization algorithms on a Bayesian Network.

In some aspects, the techniques described herein relate to a computer implemented method, further including: generating, with a processor, a user interface displaying the plurality of decoys and the decoy probability for each decoy of the plurality of decoys for an end user to determine the spendable and valid input.

In some aspects, the techniques described herein relate to a computer implemented method, further including receiving, at the user interface, user input data indicating the Monero transaction identification data for searching, tracing, and tracking Monero transaction chains was used in an illegal transaction.

In some aspects, the techniques described herein relate to a computer implemented method, further including: sending the user input data indicating the Monero transaction identification data for searching, tracing, and tracking Monero transaction chains was used in an illegal transaction to a Monero related Virtual Asset Service Provider (VASP).

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 3 is another User Interface (UI) of a real-time monitoring dashboard of consumer compute resources for searching, tracing, and tracking Monero transaction chains, according to exemplary embodiments of the present technology.

DETAILED DESCRIPTION

Figure 1:
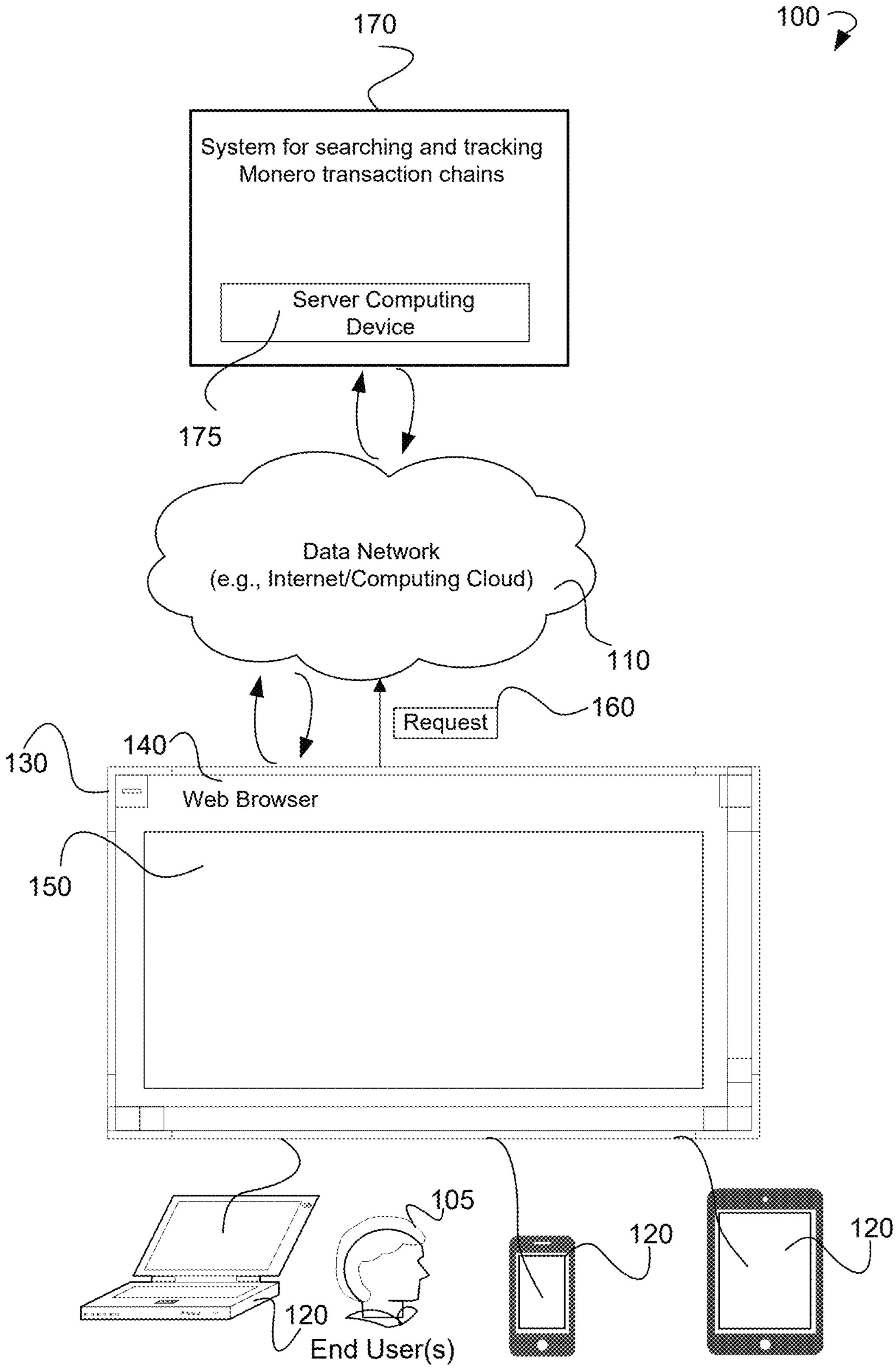
FIG. 1 illustrates an environment within which methods and systems for searching, tracing, and tracking Monero transaction chains can be implemented, according to exemplary embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

Various exemplary embodiments described and illustrated herein relate to systems and methods of forensic technologies that may be used by law enforcement, regulators, and the intelligence community to understand how the Monero virtual currency operates, to monitor and track criminal activities that use the Monero cryptocurrency system, and to assist in the deanonymization of Monero transactions. The present technology includes algorithmic and statistical analysis systems and methods, as well as dynamic systems and methods (e.g., deploying a Monero node to a Monero network) that interact with the Monero transaction processing blockchain ecosystem.

Cryptocurrencies have the following exemplary qualities, including being a decentralized currency, having a fixed inflation rate, being invented during the Global Financial Crisis, being pseudonymous, working on the principal the miners-get-rewarded, having many business opportunities (e.g., local exchanges), being a payment instrument, and being an investment instrument.

For example, a cryptocurrency is a decentralized currency because an electronic currency is not tied to a bank, or even a fiat currency (e.g., United States dollars (USD)). A cryptocurrency may float and has its own governance (or lack thereof).

A cryptocurrency has a fixed inflation rate. For example, the inflation rate of Bitcoin is fixed and is not dependent on quarterly meetings of a central banking system (e.g., the Federal Reserve for the U.S.). Thus, there is a linear and predictable inflation of cryptocurrencies. Given price increases in the Bitcoin, one may argue that Bitcoin is a deflationary currency.

Cryptocurrencies were invented during the Global Financial Crisis. For example, Bitcoin was invented in 2009 during a global meltdown of large financial institutions, which leant credibility to cryptocurrencies and an almost fanatical following.

Cryptocurrencies have pseudonymous. For example, much is made of alleged anonymous nature of Bitcoin, especially for illegal transactions. Many illegal services accessed over Tor/onion routing hidden services, accept cryptocurrencies (e.g., Bitcoin, Litecoin and Darkcoin, and the like) for anonymous payments. The fact is that Bitcoin, along with other virtual currencies, is pseudonymous and not truly anonymous. Embodiments of the present technology provide more transparency to cryptocurrency transaction chains including Monero transaction chains.

Miners of cryptocurrencies get rewarded. For example, the nature of a distributed blockchain through mining and mining rewards has created a business for transaction confirmation that is between one-million USD and four-million USD per day, depending on the price of Bitcoin. Thus, there is a market of about three-hundred-and-sixty-million USD to about one-billion-and-three-hundred-million USD per year, which encourages miners to invest in the network of Bitcoin.

Cryptocurrencies provide many business opportunities (e.g., local cryptocurrency exchanges). For example, Bitcoin creates business opportunities for businesses in many countries to act as currency exchanges, which further fuels cryptocurrencies and the economics that drive them. For example, in March 2015 Hawala type systems emerged (e.g., Abra, a financial services and technology company that operates a comprehensive, custodial cryptocurrency wallet and exchange), which enable users that do not have access to traditional banking systems to perform cross border transactions. However, at the same time that cryptocurrencies provide business opportunities, cryptocurrencies also open the downside possibility of untracked terrorist financing and facilitating illegal transactions.

Cryptocurrencies are a payment instrument. For example, Bitcoin is a legitimate payment instrument and is accepted by major merchants including Apple®, Microsoft®, Target®, PayPal®, Zappos®, Wordpress®, Home Depot®, Zynga® and Tesla®, just to name a few.

Cryptocurrencies are an investment instrument. For example, Bitcoin has surged in value from two USD per coin in 2011 to over 250 USD per coin in 2015, making Bitcoin one of the world's best investment instruments. Some investors were lucky enough to sell at over one-thousand USD per coin in 2014. The investment potential of Bitcoin cannot be underestimated.

Presently there are over two-thousand cryptocurrencies in operation, including Bitcoin, Ethereum, Monero, Zcash, Litecoin, and Dogecoin, just to name a few. Monero was first proposed in 2013 as a privacy-oriented cryptocurrency (initially known as CryptoNote). Monero is presently used by over forty percent of dark marketplaces on the Internet for illicit payment transactions involving stolen bank credentials, child exploitation, weapons trafficking, and other illegal transactions. A problem is that analysis of Monero transaction chains has proven to be particularly problematic for law enforcement, financial investigators, regulators, and private industry companies who assist these organizations. Embodiments of the present technology include systems and methods for searching, tracing, and tracking Monero transaction chains that assist with financial investigations, risk management, compliance, anti-money laundering, and law enforcement.

Research regarding the tracking and de-anonymization of cryptocurrency transactions include the following relevant research papers that are incorporated by reference herein: Ye, Ojukwu, Hsu, Hu (2020), Alt-Coin Traceability; Van Saberhagen (2013), CryptoNote v2.0; Biryukov et al. (2014), Deanonymization of clients in Bitcoin P2P network; Fleder et al. (2015), Bitcoin Transaction Graph Analysis; Moser et al. (2013), An Inquiry into Money Laundering Tools in the Bitcoin Ecosystem; Meiklejohn et al (2014), A Fistful of Bitcoins: Characterizing Payments Among Men with No Names; Reid and Harrigan (2013), An Analysis of Anonymity in the Bitcoin System.

Various embodiments of the present technology include systems and methods that monitor, search, track, and trace Monero transaction chains. In some embodiments systems and methods of the present technology provide a list of transaction chains that terminate with an identifiable address or transaction by searching both forward and backward in transaction-time from a Monero cryptocurrency payment address or transaction, or a pair of a transaction and addresses. Systems and methods of the present technology reduce decoy addresses, provide a probabilistic measure for assessing the chances that a receiver received funds from the sender. Some embodiments use statistical analysis including non-deterministic algorithms based on random simulation (e.g., Monte Carlo Tree Search (MTCS)), as well as dynamic interaction with the Monero payment network, for tracing Monero payments, wallets, individuals, and a Monero-related Virtual Asset Service Provider (VASP) that are interpreted in by a user using a User Interface (UI) as well as an Application Programming Interface (API).

In various embodiments a Virtual Asset Service Provider (VASP) is defined as a business that conducts one or more of the following actions on behalf of its clients: exchange between virtual assets and fiat currencies, exchange between one or more forms of virtual assets, transfer of virtual assets, safekeeping and/or administration of virtual assets or instruments enabling control over the virtual assets, participating in and provision of financial services related to an offer by an issuer or sale of a virtual asset, and the like. For example, in various embodiments a VASP encompasses a range of crypto businesses, including exchanges, ATM operators, wallet custodians, and hedge funds. Moreover, VASPs may be subject to the same stringent anti-money laundering (AML) and Counter-Terrorism Financing (CTF) requirements and KYC (Know Your Customer) requirements as traditional financial institutions.

Embodiments of the present technology include systems and methods for law enforcement, government agencies, financial investigators and others to explore cryptocurrency flows to assist in Monero investigations. For example, forensic tools for law enforcement and government agencies to explore Monero transaction flows to assist in investigations.

Some embodiments include transaction visualization tools for Monero based transaction flows and systems and methods to track stolen Monero currencies or Monero currencies used in illegal transactions. Various embodiments include real-time, "live" transaction nodes that participate in Monero ecosystems and can provide actionable intelligence for analysis tools. Various embodiments include original tracing methods based on a non-deterministic algorithms based on random simulation (e.g., Monte Carlo Tree Search (MTCS)) and optimization algorithms on a Bayesian Network (e.g., Bayes Optimal Randomized Incremental Construction). Some embodiments include statistical and probabilistic methods for scoring transaction and clustering of likely owners of multiple addresses into "wallets." Some embodiments include attack methods against the network layer anonymity solution Dandelion Protocol. Some embodiments include monitoring systems and methods for gaining intelligence about users of Monero (e.g., by monitoring the Monero transactions of Monero users) that do not operate a full Monero transaction node but rely on third-party operated nodes over the Internet or other networks.

In various embodiments a node is a device or data point in a larger network (e.g., a device in the network of Monero transactions). A node may be a connection point, a redistribution point, or a communication endpoint of Monero transaction chains. A node may be devices or data points on a large network, devices such a PC or mobile computing device. In general, a node has a programmed or engineered capability that enables the node to recognize, process, or forward transmissions to other nodes. For example, to recognize, process, or forward transmissions to other nodes for Monero transaction chains.

Embodiments of the present technology include deploying a full Monero node that verifies transactions and collects live blockchain data to gather intelligence about connections that cannot be obtained from the blockchain including software that is deployed and managed to produce Monero nodes to gather intelligence about other Monero nodes and accounts. Embodiments allow nodes to be deployed quickly on cloud computing resources and services systems such as Google Cloud Platform (GCP), Amazon Web Services (AWS), and the like.

Embodiments include a Monero blockchain data extraction system to persist raw blockchain data in analyzable form directly from nodes. For example, a software component of the present technology is a C++ parser that allows raw blockchain data to be taken from an internal database, while a Remote Procedure Call (RPC) parser uses the full node provided RPC endpoints to abstract raw blockchain data into specific schemas and process them downstream, allowing the systems and methods of the present technology to stay real-time with the Monero blockchain. Embodiments also include a Monero blockchain file parser for bulk data loads. For example, embodiments use RPC directly to nodes to request all raw blockchain data formatted as JavaScript Object Notation (JSON) responses, from which embodiments convert to an Avro schema and publish as five messages to Apache Kafka® (i.e., an event streaming platform).

Various embodiments of the present technology include an Extract, Transform, Load, (ETL) pipeline that is built around an Apache Kafka® middleware cluster, which allows a fan out of Monero transaction data to be stored in a Data Base (DB) and big data platforms such as YugabyteDB®, Postgres®, Google BigQuery®, and the like. Embodiments decouple of various data pipeline microservices at the shared Avro data schema presentation layer, which is exposed to the distributed system components through a Confluent Schema Registry service providing a serving layer for metadata.

Embodiments include schemas for each level and entity type native to the Monero blockchain data structure to support analytics across all levels of Monero's blockchain data. For example, public-key reuse, isolation of decoys from mixins (i.e., mixin programming being a style of software development, in which units of functionality are created in a class and then mixed in with other classes) using an internal probability engine.

Embodiments also include tools to explore Monero transaction flows to assist in investigations. For example, tools include transaction query, exploration, and visualization systems and methods for Monero transaction flows that allow ways to track stolen Monero currencies or Monero currencies that are used in illegal transactions. These systems and methods provide a User Interface (UI) to visualize Monero transaction flows. Moreover, embodiments enable visualization of entity transaction clustering, wallet identification, exchange attribution, and other functionalities.

Monero (XMR) uses enforced privacy. For example, Monero uses enforced privacy by default for all transactions so that no user can accidentally or deliberately be traceable or insecure. Unlike public-by-default mechanisms, this protects users from accidentally not using privacy features of Monero so users cannot be scrutinized or penalized by outside actors for using private transactions. For example, enforced privacy of Monero uses mechanism described below including "stealth addressing" and unlinkability, ring signatures, Ring Confidential Transactions (RingCT), and Bulletproofs.

Monero (XMR) uses "stealth addressing" and unlinkability. For example, when a Monero user sends a receiver money, the receiver cannot tell where the money came from unless the sender provides identifying information to the receiver. For example, when a Monero user discloses their Monero wallet "address" to allow someone to send the Monero user money, no one else can know how many or if any payments at have been sent to that Monero user. If someone sends money to the Monero user twice, no one can even tell those two payments were sent to the same person. Thus, users observing the Monero network cannot see the value of funds that are being anonymously transferred. In Monero, everyone has a brand new, randomly created, one-time "public address", such as "43EH3omZSUYCmJYskCUx2tV50B5tLVrp58Ae-MYLrFhcz2umUVQHiHu62nG5CS3m vcfgKHC3fPtq6DHkEbMjqvCAZJW5nw9E." Furthermore, the funds that a Monero user owns are not associated with the "public address" of that Monero user like they are with other cryptocurrencies such as Bitcoin. For example, when a Monero user sends funds to the "public address" of a receiver, the Monero user is actually sending funds to the brand new, randomly created, one-time "public address". The use of this a brand new, randomly created, one-time "public address" means that the public record does not contain any mention that funds were received to the "public address" of the receiver. For the same reason, the funds the Monero user is sending are also not associated with the "public address" of the Monero user in the public record. Therefore, when the Monero user sends these funds, the public record will not show that the funds originated from the sender's "public address" and will not show that the funds were sent to the "public address" of the receiver. In Monero, a "public address" will never appear in the public record of a Monero transaction chain. Instead, a "stealth address" is recorded so that only the receiver can recognize the incoming funds. When the receiver checks for the funds, the receiver needs to scan the Monero blockchain ledger (i.e., the public record of all transactions) to see if any transactions are destined for the receiver. The receiver has a secret view key, which is used to check each transaction to see if it was addressed to them. Because the receiver is the only one that knows the secret view key, only the receiver can see that funds have been sent to them. The secret view key is why, if a Monero user launches their Monero wallet, they will see it "scanning" the Monero blockchain to check if any transactions have occurred that have the Monero user as the receiver. Note that the Monero user may provide his or her "secret view key" to others so that they can also see what funds they have received. The receiver of the "secret view key" can only view the transactions and cannot make any transactions on behalf of the Monero user.

Monero (XMR) uses ring signatures for enforcing untraceability. For example, even if another user somehow knew about specific anonymous funds that a Monero user controls, another user cannot tell if or when the Monero user spends those funds. Furthermore, another user cannot tell whom the Monero user has sent those funds, because Monero transactions use a cryptographic mechanism called a ring signature that make it appear to the world as if people may be using the funds of the Monero user in their own transactions. A ring signature enables transaction mixing. For example, when funds are sent, the sender randomly chooses the funds of several other Monero users to also appear in the Monero transaction as a possible source of the sent funds. The nature of the ring signature means that no one can tell which funds were the source of the transaction—not even the person that gave the funds to the sender in the first place and which one funds are decoys. Furthermore, a system of key images associated with each ring signature ensures that although no one can tell the true source of the funds, however, it can be easily detected if the sender attempts to anonymously send their funds twice. The term "mixin level" may be used to describe the number of people that are added to the list of possible senders in a transaction. Because using a larger "mixin level" increases the size of the transaction for the Monero network to process, so increasing the "mixin level" requires a larger transaction fee.

Monero (XMR) uses Ring Confidential Transactions (RingCT). In addition to ring signatures described above, Monero employs an encoding scheme called Confidential Transactions (CT) that hides transaction amounts. A combination of Confidential Transactions (CT) and ring signatures is called Ring Confidential Transactions (RingCT). Monero activated RingCT on the main network of Monero in about January of 2017. The activation of RingCT on the main network of Monero was one of the most significant updates to date of Monero. RingCT has improved the way Monero wallets may source decoys because RingCT eliminates the requirement of each value of a mixin input to be of a common denomination, as previously required by the application layer CryptoNote. Confidential Transactions (CT) use encoding (which keeps data hidden, immutable, and verifiable), instead of encryption (which keeps data hidden and reversible). The fundamental basis of Confidential Transactions (CT) is a cryptographic primitive for encoding called a Pedersen Commitment. For context, cryptographic primitives are the building blocks of systems that use cryptography and are composed of well-established algorithms like the SHA-256 hash function. The Pedersen Commitment scheme used in RingCT has an additively homomorphic property, allowing the aggregation of multiple decoy inputs through addition. This guarantees that one of the encoded inputs is spendable and valid and that the sender is not double spending funds or creating Monero (XMR) out of nothing. A byproduct of this process is a range proof that proves that the amount committed by a given Pedersen Commitment falls within a certain range and is not a negative number. The Confidential Transactions (CT) scheme also requires a special signature (e.g., Borromean Ring Signature) across all encoded commits within a transaction. When a Monero wallet generates a RingCT, all ring members' signatures are aggregated together with the amount of each input, which effectively hides the transaction amount.

Monero (XMR) uses Bulletproofs. For example, Bulletproofs address one of the main drawbacks of RingCT, which is the size of the range proofs this scheme produces. Bulletproofs are focused on applying a non-interactive zero-knowledge proof system to aggregate the range proofs of a Confidential Transaction (CT) and collectively prove their validity. For context, the basic concept behind a zero-knowledge proof is to cryptographically prove that something exists without knowing what that something is, which is achieved through a set of challenges that, if completed successfully, can statically prove that a party has a secret, without knowing what that secret is. For instance, this is the technology employed by Zcash (ZEC) to entirely shield senders, receivers, and the amount of ZEC sent in a transaction. Relative to Zero-Knowledge Succinct Non-Interactive Argument of Knowledge (zk-SNARKs), the Non-Interactive Zero Knowledge Protocol (NIZKP) system proposed by the Bulletproof white paper has both benefits and drawbacks. On the one hand, the use of NIZKP Bulletproofs does not require a trusted setup for parameter generation, like the Powers of Tao ceremony of Zcash. On the other hand, the verification of a Bulletproof is more time consuming than zk-SNARKs. Beyond improving the privacy assumptions within Confidential Transactions (CT), Bulletproofs have a much lower fingerprint (or size) relative to the proof systems used in blockchain networks today. Much like SegWit (Segregated Witness), Bulletproofs can be seen as an approach to vertical scalability since they can greatly decrease the size of a cryptographic proof from over 10 kB to less than 1 kB. For example, SegWit is the process by which the block size limit on a blockchain is increased by removing signature data from bitcoin transactions. When certain parts of a transaction are removed, this frees up space or capacity to add more transactions to the chain. For example, The Bulletproof white paper focused on applying NIZKPs to the Bitcoin blockchain and stated that, if implemented, the total size of Bitcoin's the amount of digital currency someone has left remaining after executing a cryptocurrency transaction, the unspent transaction output (UTXO), set would be only seventeen GB (compared to one-hundred-and-sixty GB) if Confidential Transactions (CT) were to be implemented. As discussed by MRL researcher Sarang Noether in December of 2017, under the current range proof format, the size of Monero (XMR) transactions scales mostly linearly depending on the number of outputs. For example, one output equals 7 kB, two outputs equal 13 kB, and so forth. Under Bulletproofs, transaction sizes will then scale logarithmically instead. For example, one output equals 2 kB, two outputs equal 2.5 kB, and so forth. Therefore, the Bulletproofs technology has the potential to significantly contribute to the scalability of Monero. The space savings granted by Bulletproofs may also enable implementation of additional obfuscation mechanisms. For instance, increasing the mandatory number of outputs in a transaction can make it significantly harder to trace balances by analyzing the blockchain. Decoys are used in ring signature inputs, but not in a transaction's outputs. Implementing a decoy output system increases the size of a transaction, but this increase may be trivial post-Bulletproof activation.

Monero (XMR) uses a Monero "Mission Impossible scheme". For example, because of the untraceability mechanisms described above (e.g., "stealth addressing" and unlinkability, ring signatures, Ring Confidential Transactions (RingCT), and Bulletproofs) other Monero users will start randomly including the anonymously received funds of a Monero user as a plausible source of funds in their own transactions. For example, one can think of Monero transaction as an elaborate "Mission Impossible scheme," where hypothetically, a whole crowd of people at a Carnival parade in Rio are all wearing full body apparatuses that shapeshift to project the appearance of multiple randomly selected people including the protagonist character (i.e., Ethan Hunt himself). So much interaction happens within the Monero network that it will look to observers as if most users have transacted with most other users. When attempting to create a list of who may have transacted with any specific user, the answer will be almost everyone and no one can claim they saw Ethan Hunt interacting with any particular person, because they know they could just as easily have been observing someone else that was simply wearing the illusion of Ethan Hunt. The "Mission Impossible scheme" underscores the importance of a design decision of Monero to enforce untraceability for all transactions. If untraceability were optional, as it is with Bitcoin or Zcash, then the size of the crowd would be much smaller. Monero ensures that all users are constantly always seen in the crowd. Even when a user is not sending or receiving, the Monero network is constantly making it look like that user is actively participating by using the "Mission Impossible scheme."

Monero (XMR) may mitigate against address masking using the network layer anonymity solution Dandelion protocol and Tor/onion routing. For example, Monero (XMR) uses masking of origin Internet Protocol (IP) address. The Dandelion protocol and Tor/onion routing are common techniques for masking the origin IP address of a cryptocurrency transaction. Both techniques have limitations unless further mitigations are implemented. For instance, the Dandelion protocol protects against incoming sybil adversaries, but not passive Internet Service Provider (ISP) monitoring. Tor/onion routing protects against incoming sybil adversaries and basic passive ISP monitoring but increases the threats of eclipse attacks and is susceptible to statistical bandwidth monitoring techniques. Monero may mitigate against all these threats by using Tor/onion routing only for peer-discovery and "whitened" stem phase (e.g., Dandelion++) transaction broadcasting.

Various embodiments of the present technology enable a Monero node operation. For example, systems and methods operate a Monero node in Monero transaction chains with the deployed Monero node actively participating in the Monero network including collecting data of the Monero network.

Various embodiments of the present technology include automatic updates, real-time processing, data storage, and an Extract, Transform, Load, (ETL) pipeline. Embodiments provide real-time processing and ingestion of Monero transactions in order to enable law enforcement and government agencies to explore Monero transaction flows to assist in investigations and to power transaction visualization tools for Monero based transaction flows as well as ways to track stolen Monero currencies or Monero currencies used in illegal transactions. For example, embodiments include a domain model for Monero blocks and P2P protocol messages as well as an Avro schema that holds information on Monero blocks. For instance, the Extract, Transform, Load, (ETL) pipeline for Monero may be deployed into a cloud-agnostic orchestration framework based on Kubernetes (i.e., an open-source container-orchestration system for automating computer application deployment, scaling, and management.) Embodiments implement a Monero node Remote Procedure Call (RPC) client in Python to process the current day Monero blocks as the Monero blocks are mined. Embodiments also include a blockchain file parser in C++ to process all Monero blocks produced before the current date in batch mode. Embodiments of the present technology include a data normalizer microservice to transform raw Monero blocks published on Apache Kafka® (i.e., event streaming platform) into a normalized "value transfer" format supported by a core analytics framework of the present technology. After the initial production of data from the RPC Parser into Apache Kafka®, a block consumer ingests the Monero blocks. Monero blocks ingestion enables the validation/sanitizing of the Monero data and the persisting of various data points into a Big Data platform such as YugabyteDB®, Postgres®, and the like for further development and production use. Embodiments also implement several real-time monitoring dashboards, including one for the monitoring of Apache Kafka® topic partition size and offsets per topic and real-time monitoring of consumer compute resources.

Referring now to the drawings, FIG. 1 illustrates an environment within which methods and systems for searching, tracing, and tracking Monero transaction chains can be implemented, according to exemplary embodiments of the present technology. The environment 100 may include a data network 110 (e.g., an Internet or a computing cloud), end user(s) 105, client device(s) 120 associated with the end user 105, and a system 170 for searching, tracing, and tracking Monero transaction chains. In some embodiments, end user (s) 105 may include members of law enforcement, financial investigators, regulators, and members of private industry companies who assist these organizations, and the like. Client device(s) 120 may include a personal computer (PC), a desktop computer, a laptop, a smartphone, a tablet, or so forth.

The system 170 may include a server computing device 175. The client device 120 may include a user interface 130. Furthermore, a web browser 140 may be running on the client device 120 and rendered using the user interface 130. The web browser 140 may communicate with the server computing device 175 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Figure 8:
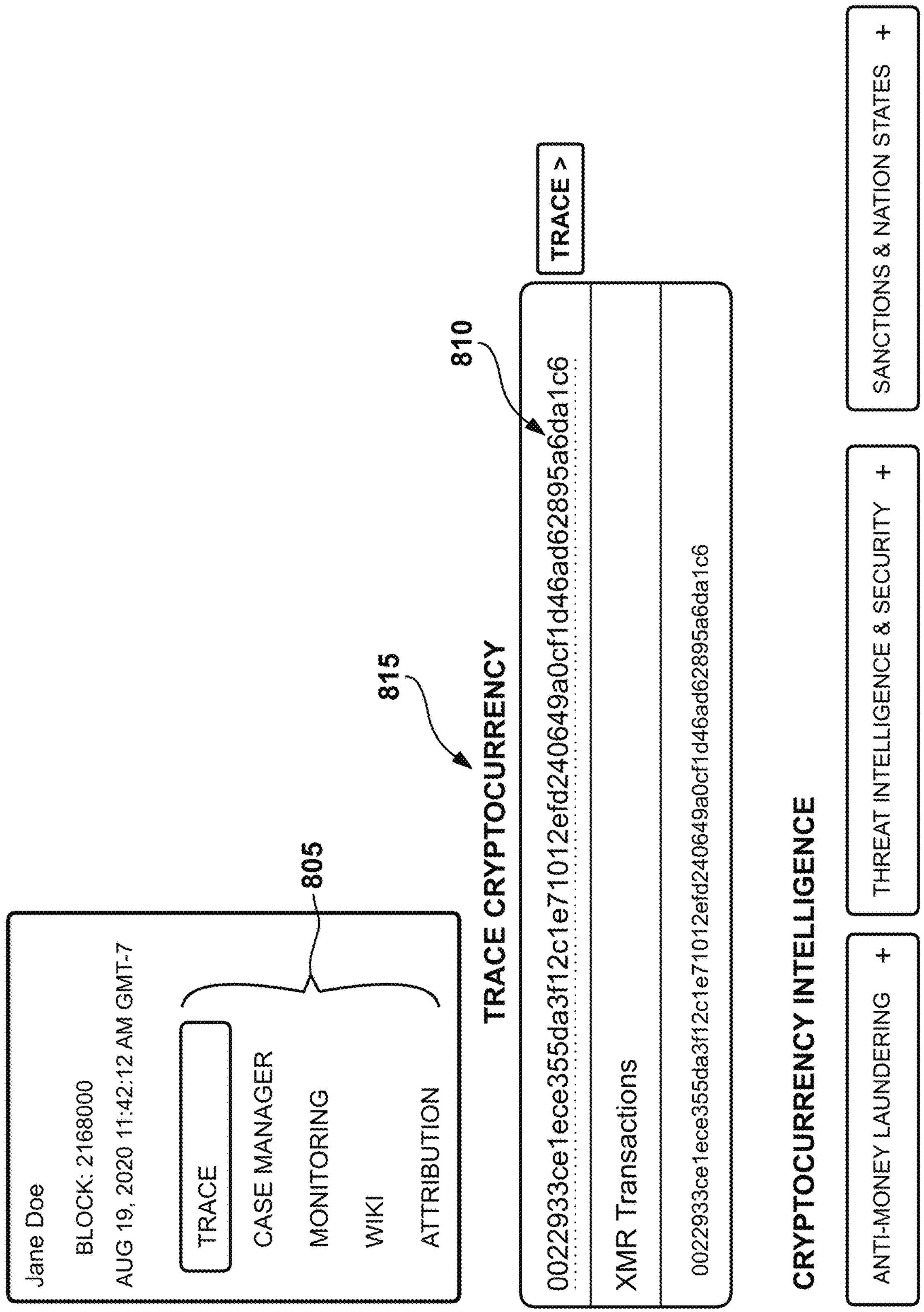
FIG. 8 is a cryptocurrency User Interface (UI) for searching, tracing, and tracking Monero transaction chains, according to exemplary embodiments of the present technology.

In various embodiments, the web browser 140 may display a web page associated a plurality of Monero transaction menus 150 (e.g., a plurality of Monero transaction menus 805 shown in FIG. 8), which the end user(s) 105 can view the plurality of Monero transaction menus 150 (e.g., the plurality of Monero transaction menus 805 shown in FIG. 8) The web browser 140 may establish a communication channel with the server computing device 175 and generate and render virtual screens based on data received from the server computing device 175.

In some embodiments, the end user 105 can send a request 160 to the system 170 using the client device 120. The request 160 may include Monero transaction identification data. In some embodiments, the request 160 may be raw blockchain data.

Figure 2:
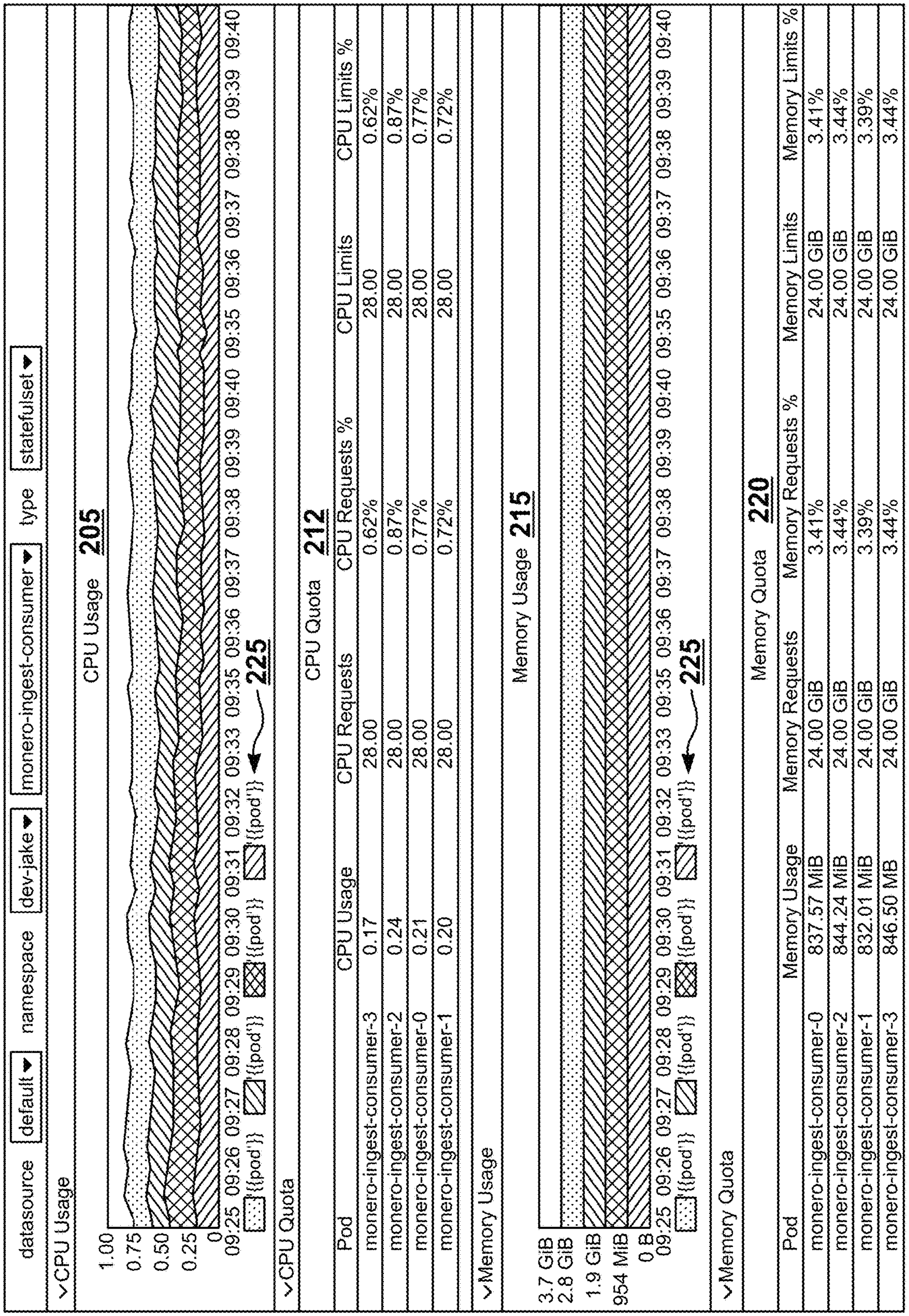
FIG. 2 is a User Interface (UI) of a real-time monitoring dashboard of consumer compute resources for searching, tracing, and tracking Monero transaction chains, according to exemplary embodiments of the present technology.

FIG. 2 is a User Interface (UI) of a real-time monitoring dashboard of consumer compute resources for searching, tracing, and tracking Monero transaction chains, according to exemplary embodiments of the present technology. For example, embodiments including monitoring, using the server computing device (e.g., the server computing device 175) Monero network transaction chain data on the Monero network based on the Monero network transactions, the Monero network transaction chain data comprising input data and output data of Monero network transactions. FIG. 2 shows compute resources used by Monero users including Central Processing Unit (CPU) usage 205, CPU quota 210, memory usage 215, and memory quota 220 utilized by Monero users that monitor, using a Monero node, Monero network transaction chain data on the Monero network based on the receiving and sending Monero network transactions by the Monero node, the Monero network transaction chain data comprising input data and output data of Monero network transactions. A Monero user is referred to as a pod 225 in FIG. 2.

FIG. 3 is another User Interface (UI) of a real-time monitoring dashboard of consumer compute resources for searching, tracing, and tracking Monero transaction chains, according to exemplary embodiments of the present technology. FIG. 3 shows compute resources used by Monero users including memory quota 305, current network usage 310, receive bandwidth packets 315, and transmit bandwidth 320 for Monero users referred to as pods. For example, FIG. 3 shows data of embodiments of monitoring, using the server computing device (e.g., the server computing device 175) Monero network transaction chain data on the Monero network based on the Monero network transactions, the Monero network transaction chain data comprising input data and output data of Monero network transactions. A Monero user is referred to as a pod 225 in FIG. 3.

Figure 4:
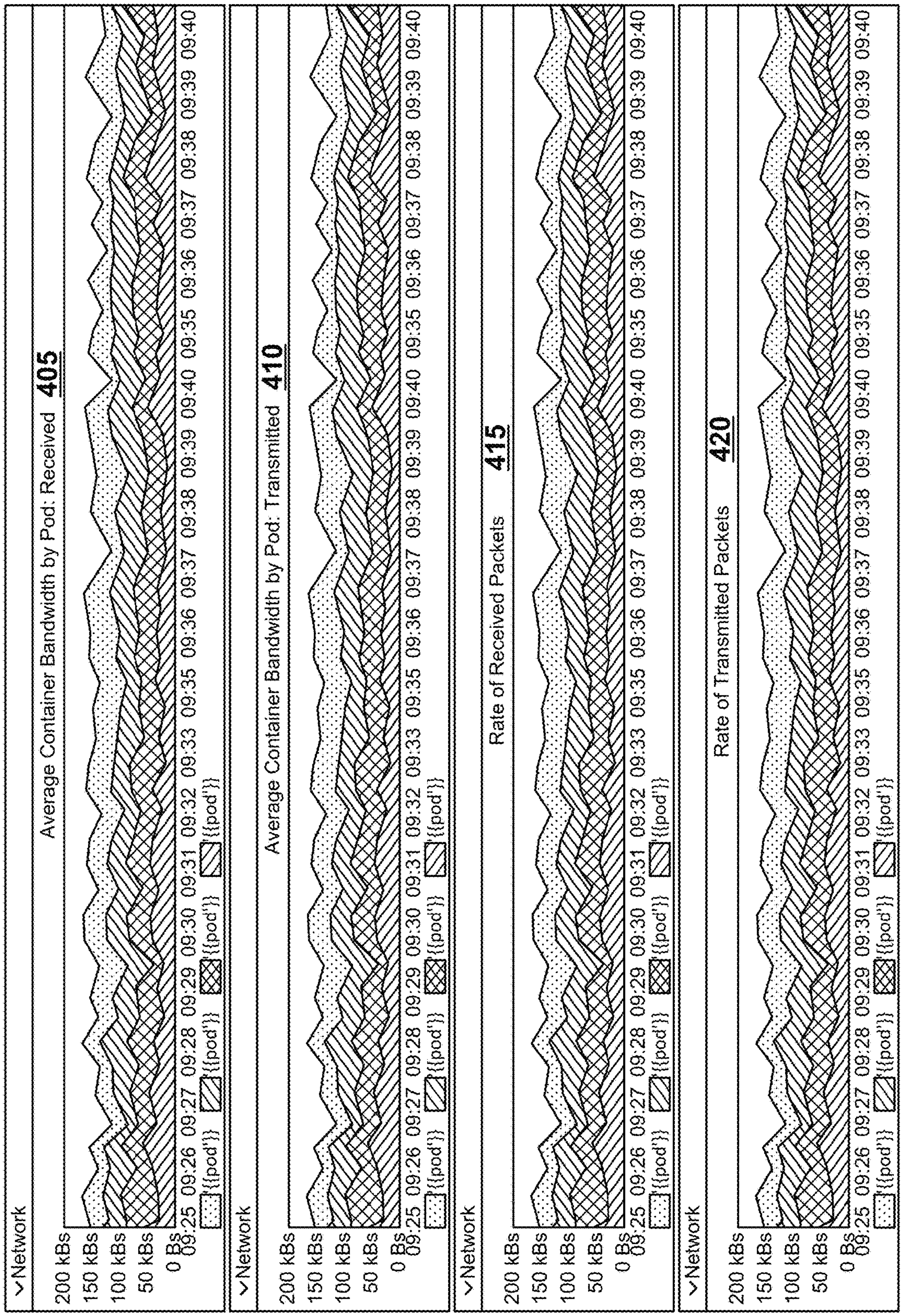
FIG. 4 is a User Interface (UI) of a real-time monitoring dashboard of consumer compute resources for searching, tracing, and tracking Monero transaction chains, according to exemplary embodiments of the present technology.

FIG. 4 is a User Interface (UI) of a real-time monitoring dashboard of consumer compute resources for searching, tracing, and tracking Monero transaction chains, according to exemplary embodiments of the present technology. FIG. 4 shows compute resources used by Monero users including average container bandwidth received (by pod 225) 405, average container bandwidth transmitted (by pod 225) 410, rate of received packets 415, and rate of transmitted packets 420 utilized by Monero users that monitor, using a Monero node, Monero network transaction chain data on the Monero network based on the receiving and sending Monero network transactions by the Monero node, the Monero network transaction chain data comprising input data and output data of Monero network transactions. A Monero user is referred to as a pod 225 in FIG. 4. For example, FIG. 4 shows data of embodiments of monitoring, using the server computing device (e.g., the server computing device 175) Monero network transaction chain data on the Monero network based on the Monero network transactions, the Monero network transaction chain data comprising input data and output data of Monero network transactions.

Figure 5:
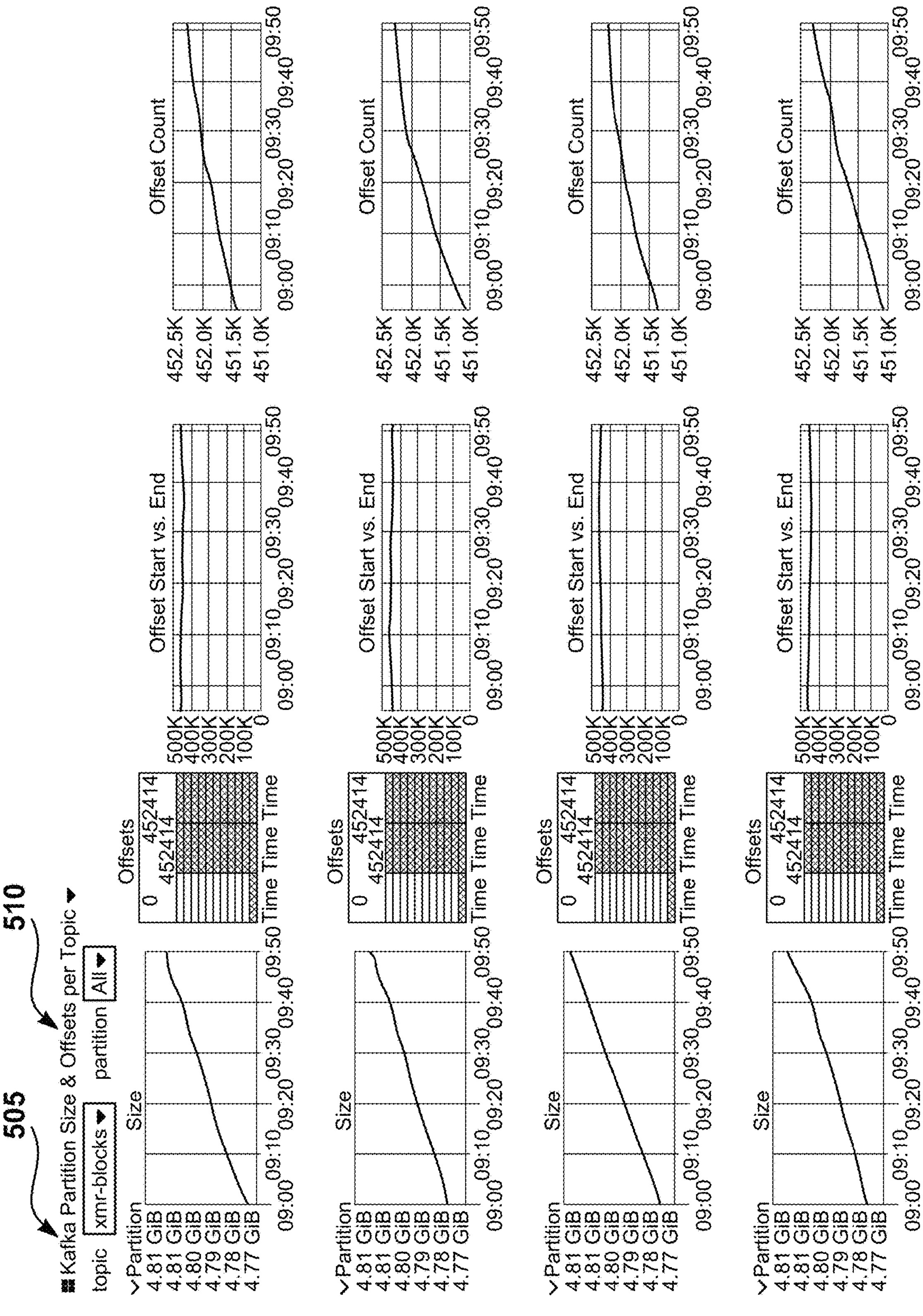
FIG. 5 is a User Interface (UI) of a real-time monitoring dashboard of consumer compute resources for searching, tracing, and tracking Monero transaction chains, according to exemplary embodiments of the present technology.

FIG. 5 is a User Interface (UI) of a real-time monitoring dashboard of consumer compute resources for searching, tracing, and tracking Monero transaction chains, according to exemplary embodiments of the present technology. FIG. 5 shows a real-time monitoring dashboard for monitoring of Apache Kafka® topic partition size 505 and offsets per topic 510 for searching, tracing, and tracking Monero transaction chains. For example, FIG. 5 shows data of embodiments of monitoring, using the server computing device (e.g., the server computing device 175) Monero network transaction chain data on the Monero network based on the Monero network transactions, the Monero network transaction chain data comprising input data and output data of Monero network transactions.

Figure 6:
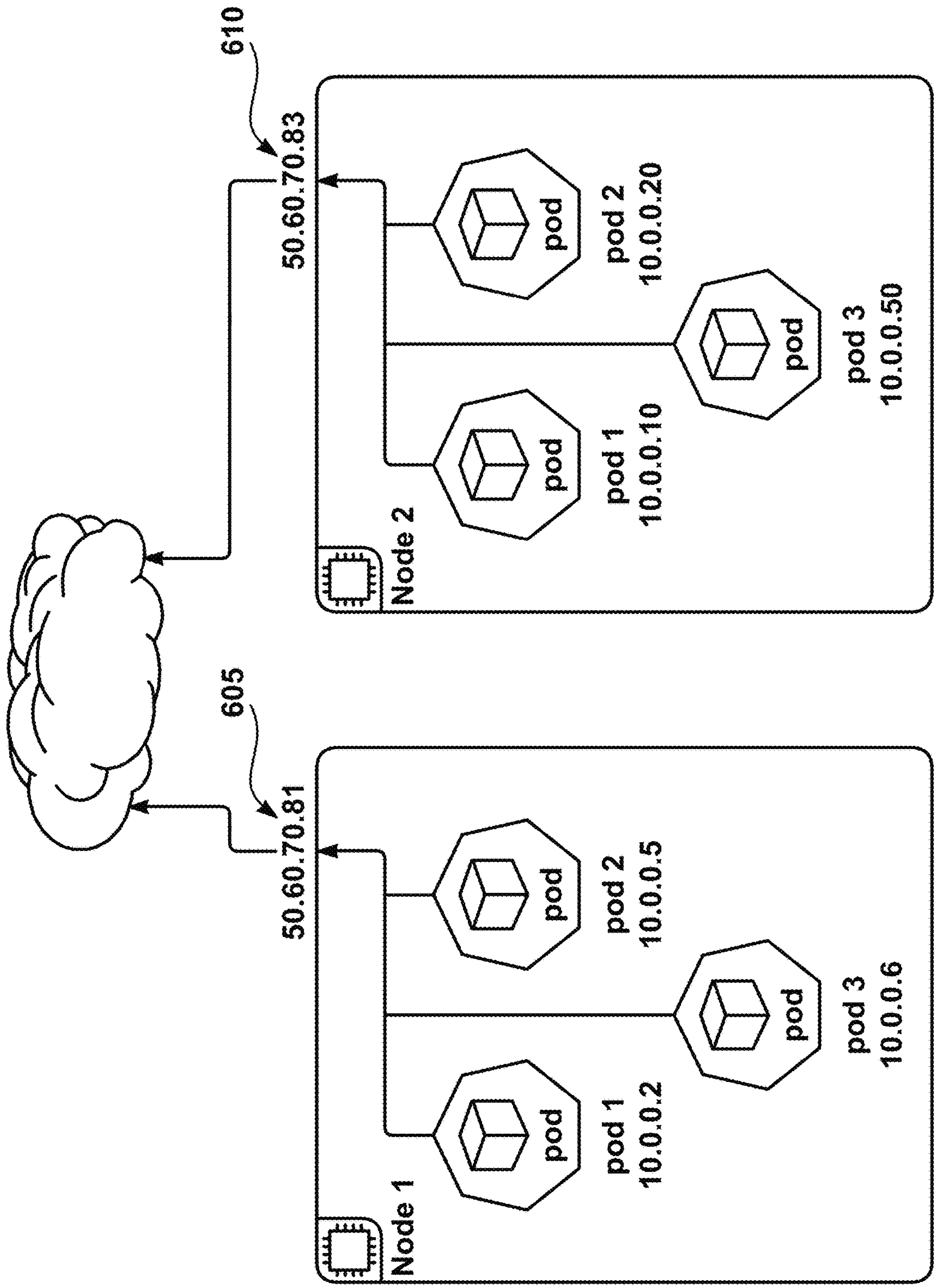
FIG. 6 is an illustration showing the 1,000 nodes problem, according to exemplary embodiments of the present technology.

FIG. 6 is an illustration showing the 1,000 nodes problem, according to exemplary embodiments of the present technology. FIG. 6 illustrates that when running a plurality of pods comprising containerized applications on a node, all the pods from the same node use the same public IP address of the host node for ingress and egress to the Internet. Therefore, using the same public IP address of the host node for all the plurality of pods on the same node allows the plurality of pods and the containerized applications in the same node to be discovered to be from the same group because each pod from the same node uses the same public IP address of the node. Accordingly, an observer of the public IP address for each of the plurality of pods could determine that the plurality of pods are from the same node or network because they have the same public IP address. For example, FIG. 6 shows each of the three pods for each host node using the same public IP address. For instance, exemplary node 1 has the same public IP address 605 for three different pods and exemplary node 2 has the same public IP address 610 for three different pods. If the present technology deployed, using the server computing device, a Monero node to a Monero network using the 1,000 nodes problem as shown in FIG. 6, the Monero node would not be receiving and sending Monero network transactions from the Monero network because the Monero node could be detected because the plurality of pods are from the same node (e.g., exemplary node 1 has the same public IP address 605 for three different pods and exemplary node 2 has the same public IP address 610 for three different pods) or network because they have the same public IP address.

Figure 7:
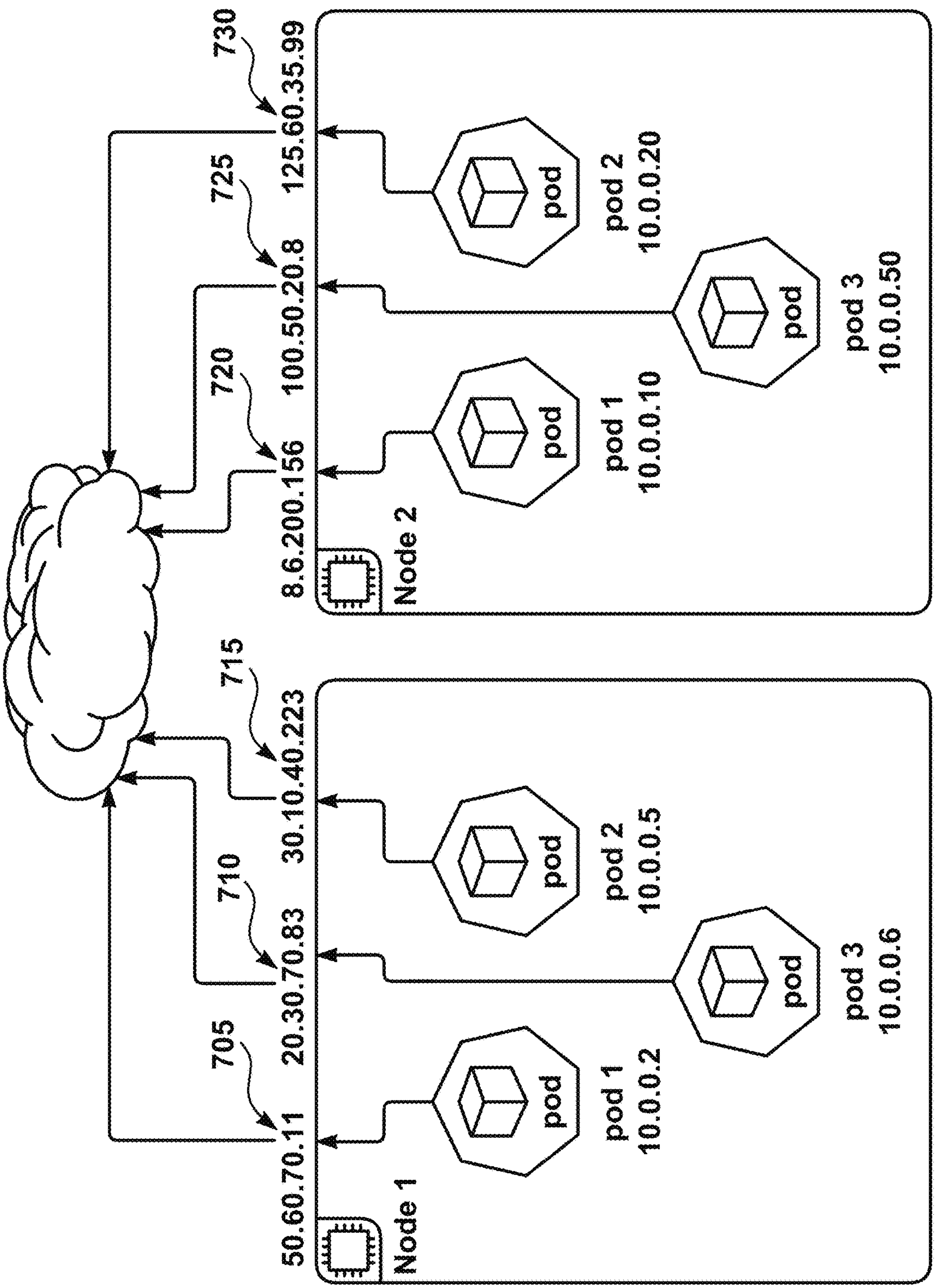
FIG. 7 is an illustration showing the 1,000 nodes solution, according to exemplary embodiments of the present technology.

FIG. 7 is an illustration showing the 1,000 nodes solution, according to exemplary embodiments of the present technology. FIG. 7 illustrates making each of the plurality of pods comprising containerized applications on the node map to a distinct public IP address so that each pod has a distinct IP address. Therefore, using the distinct public IP address for each of the plurality of pods on the same node prevents the plurality of pods and the containerized applications in the same node to be discovered to be from the same group because each pod from the same node uses a distinct public IP address. Accordingly, an observer of the public IP address for each of the plurality of pods cannot determine that the plurality of pods are from the same node or network. For example, FIG. 7 shows each of the three pods for each host node using a distinct public IP address. For instance, exemplary node 1 has a different public IP address for each of three different pods (e.g., public IP address 705, public IP address 710, and public IP address 715). Furthermore, exemplary node 2 has a different public IP address for each of three different pods (e.g., public IP address 720, public IP address 725, and public IP address 730). According, the present technology may deploy a Monero node to a Monero network, the Monero node receiving and sending Monero network transactions from the Monero network; and monitor, using the Monero node, Monero network transaction chain data on the Monero network based on the receiving and sending Monero network transactions by the Monero node, the Monero network transaction chain data comprising input data and output data of Monero network transactions.

deploy, using the server computing device, a Monero node to a Monero network, the Monero node receiving and sending Monero network transactions from the Monero network using the distinct public IP address for each of the plurality of pods on the same node that prevents the plurality of pods and the containerized applications in the same node to be discovered to be from the same group because each pod from the same node uses a distinct public IP address.

Systems and methods for searching, tracing, and tracking Monero transaction chains use identified metadata and logging of that metadata to develop the present technology. Embodiments of the present technology was developed using ShapeShift API (e.g., for identification of cross-chain transactions) and reviewing Monero source code, to identify relevant metadata. This identified metadata may be captured during the operation of a Monero node as it communicates with other nodes on the Monero network. This identified metadata may assist with partially linking IP addresses to future Monero transactions. Embodiments include original tracing methods based on non-deterministic algorithms based on random simulation (e.g., Monte Carlo Tree Search (MTCS)) and optimization algorithms on a Bayesian Network (e.g., Bayes Optimal Randomized Incremental Construction). For example, Monte Carlo Tree Search (MCTS) uses randomness for deterministic problems which are difficult or impossible to solve using other approaches. For instance, one of the most common uses of the Monte Carlo Tree Search (MCTS) is in the field of computer games, where it has been used for machine-generated evaluation functions for Othello, Chess, Go, and many other programs that play other board games, real-time video games, and nondeterministic games (such as Magic: The Gathering and Settlers of Catan). Accordingly, the present technology uses Monte Carlo Tree Search (MCTS) as part the tracing methods for the "game-like" methods for tracing Monero transactions and for detecting decoys.

In some embodiments another component of the present technology includes optimization algorithms on a Bayesian Network (e.g., Bayes Optimal Randomized Incremental Construction). For example, a Bayes network is a probabilistic graphical model that represents a set of variables and their conditional dependencies via a Directed Acyclic Graph (DAG). Bayesian networks are ideal for taking an event that occurred and predicting the likelihood that any one of several possible known causes was the contributing factor. For example, a Bayesian network could represent the probabilistic relationships between diseases and symptoms. Given symptoms, the network can be used to compute the probabilities of the presence of various diseases. For instance, the idea of the Bayes Optimal Randomized Incremental Construction approach is to add objects in a random order and show that this approach yields efficient/optimal bounds on running time.

Embodiments of the present technology use an understanding of Monero addresses verses keys. For example, most cryptocurrency wallets will display an address of a user as either a human-readable format, such as a long string of characters and numbers or as a Quick Response (QR) code. Furthermore, most cryptocurrency wallets derive addresses from a public and private keypair that are used for deriving addresses and signing transactions. Moreover, in most blockchains these addresses are either stored on the blockchain as scripts or as their full address. In contrast, Monero, never stores an address of a user on-chain. In order to receive Monero currency, a Onero user may share their "stealth address" that is computed by the sender of Monero (XMR) further takes the "public address" of the receiver and transforms the "public address" to a one-time address in order to make the one-time address unlinkable to the primary "public address". Monero also employs what are known as sub-addresses, which are any number of addresses that can be generated from a given secret seed and used to deposit all into the same wallet. Primary addresses have the prefix of '4'. Sub-addresses have the prefix of '8'. The "stealth addresses" that are mentioned are one-time addresses. These one-time addresses are generated via taking a public key of a Monero user and incorporating random data to derive a one-time public key. Embodiments of the present technology track Monero users who have re-used one-time addresses throughout the blockchain. As mentioned above, a Monero "public address" incorporates two keys: the public view key and the public spend key. In order to view all transactions for a given primary address, one will need to provide the full address, view key, and transaction hash. The present technology performed multiple transactions on the Monero blockchain to further investigate how to abstract attribution from on-chain transactions through details of sub-addresses, payment identifications, and so forth. Moreover, the present technology provides a solution to search by an address. For example, if law enforcement agents and/or operators in the field obtain a Monero wallet and are granted access, the agents and/or operators will be able to access a list of Monero transactions which will contain the Transaction ID. After obtaining the Transaction ID, users of systems of the present technology may input this Transaction ID into a trace cryptocurrency User Interface (UI) and trace the origin of funds by tracing backwards through the ring signatures (i.e., mixins) that are the subgraph of inputs (i.e., key images) enabling full traceability of the Monero blockchain.

FIG. 8 is a User Interface (UI) of a trace cryptocurrency User Interface (UI) for searching, tracing, and tracking Monero transaction chains, according to exemplary embodiments of the present technology. For example, the present technology may generate, with a processor, a user interface having a plurality of Monero transaction menus 805. FIG. 8 shows an exemplary use case for understanding Monero cash transaction flows to assist in investigations. For example, an investigator (e.g., end user 105) may execute a search warrant as part of an active investigation. On Aug. 19, 2020, the investigator finds a note in the apartment of a criminal suspect that reads with the following an investigation address 810:

"0022933celece355da3f12c1e71012efd240649a0-cf1d02d46ad62895a6da1c6" The investigator has no idea what the investigation address 810 means, although the investigator has a hunch that the investigation address 810 may have something to do with cryptocurrencies. The investigator (e.g., end user 105) enters the investigation address 810 (i.e., "0022933celece355da3f12c1e-71012efd240649a0cf1d02d46ad62895a6da1c6") into a trace cryptocurrency search bar 815 of the User Interface (UI) of the present technology, and embodiments intelligently provide to the investigator (e.g., end user 105) that the investigation address 810 is a Monero transaction ID. For example, the present technology may receive, at the user interface (e.g., User Interface (UI) of FIG. 8) using the plurality of Monero transaction menus (e.g., the plurality of Monero transaction menus 805), Monero transaction identification data (e.g., the investigation address 810) for searching, tracing, and tracking Monero transaction chains. Embodiments enable a user (e.g., investigator) to search the Monero transaction chains of a Monero transaction of interest by entering the transaction ID (e.g., the investigation address 810) in the trace cryptocurrency search bar 815 of the User Interface (UI) as shown in FIG. 8.

Figure 9:
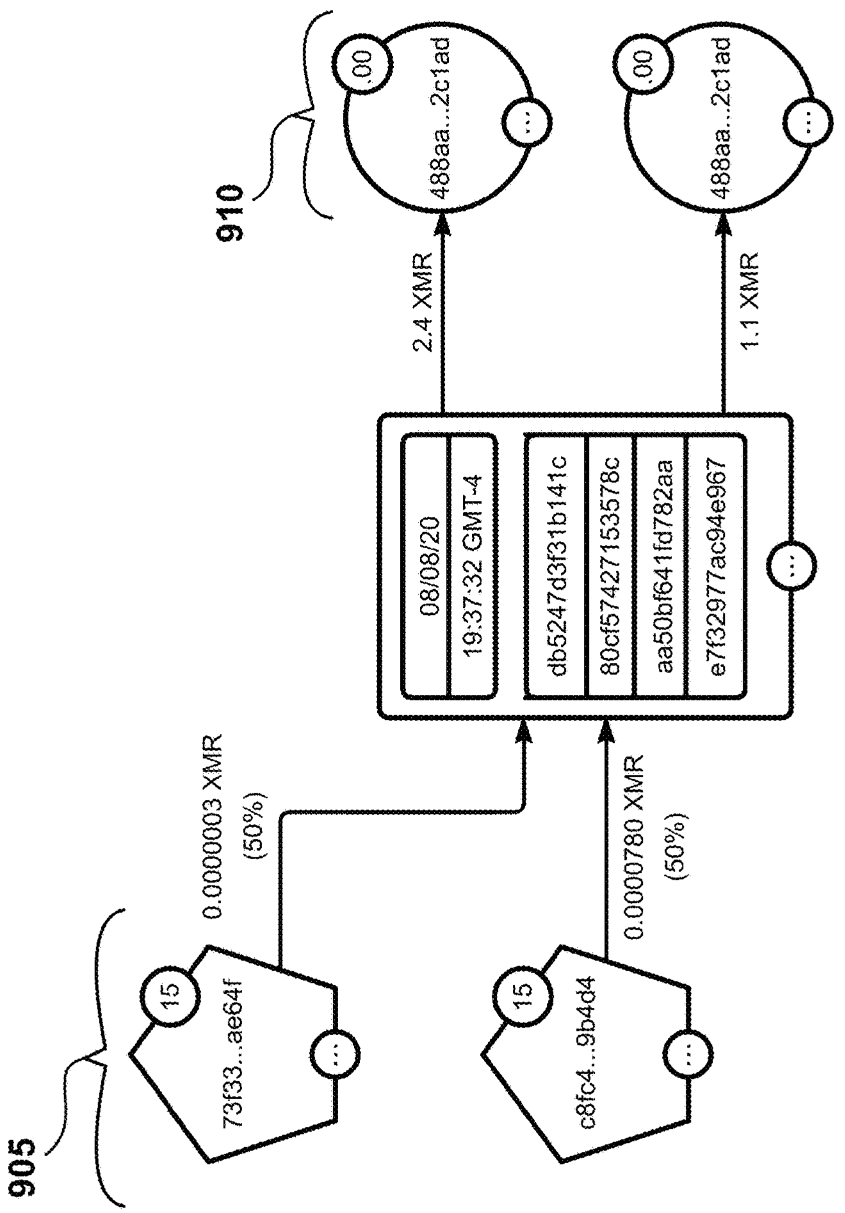
FIG. 9 is a User Interface (UI) showing inputs and outputs for searching, tracing, and tracking Monero transaction chains, according to exemplary embodiments of the present technology.

FIG. 9 is a User Interface (UI) showing inputs and outputs for searching, tracing, and tracking Monero transaction chains, according to exemplary embodiments of the present technology. For example, FIG. 9 shows that a Monero transaction has one or more inputs and one or more outputs. For example, in the inspector interface shown in FIG. 9, inputs are indicated with by pentagons 905, and outputs are indicated by circles 910. When a Monero user sends a Monero transaction, the Monero transaction reveals to the rest of the network how many inputs and how many outputs are sent in the Monero transaction. Accordingly, when a Monero user sends multiple Monero transactions, multiple Monero transactions may reveal a large amount of information with this metadata. Inputs are spent in their entirety and generate outputs that go to different destinations or the same destination. This is not unique to Monero; this structure of consuming inputs and generating outputs is how Bitcoin and other Unspent Transaction Output (UTXO), work with other cryptocurrencies. The number of inputs and outputs depends on what a Monero user is attempting to accomplish. Most commonly a Monero transaction consumes one or two inputs depending on the total hidden value contained in those inputs. Typically, a Monero transaction will have one destination output, and one other output where the change—the remaining balance—is sent back to the user. These inputs and outputs are protected by Monero's "stealth addresses". In the inspector interface shown in FIG. 9, inputs are indicated with by pentagons 905, and outputs are indicated by circles 910. A Monero transaction may have at least two outputs to hide information that could be revealed if only one output was generated. For example, FIG. 9, shows two outputs (i.e., circles 910). The present technology may determine, at the server computing device, an input (e.g., the pentagons 905) of the Monero transaction identification data and an output (e.g., circles 910) of the Monero transaction identification data.

Figure 10:
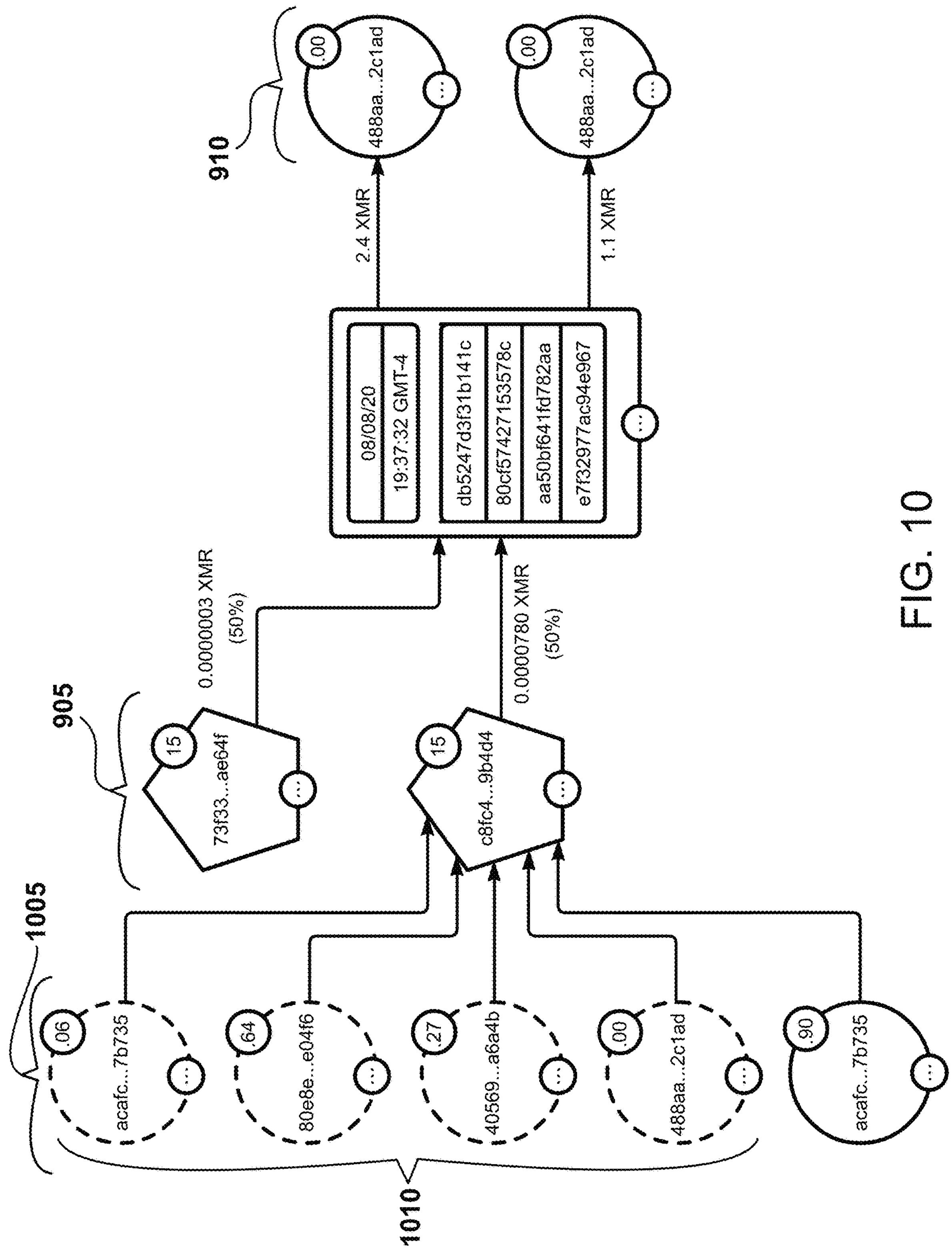
FIG. 10 is a User Interface (UI) of an inspector interface showing a ring signature including a plurality of decoys and a decoy probability for each decoy of the plurality of decoys for searching, tracing, and tracking Monero transaction chains, according to exemplary embodiments of the present technology.

FIG. 10 is a User Interface (UI) of an inspector interface showing a ring signature including a plurality of decoys and a decoy probability for each decoy of the plurality of decoys for searching, tracing, and tracking Monero transaction chains, according to exemplary embodiments of the present technology. For example, FIG. 10 shows that each of the inputs (i.e., pentagons 905) is obscured by ring signature circles 1005 as separate rings of decoys in a ring signature. For example, if a user clicks on an input (i.e., a pentagon of the pentagons 905), the inspector interface shows the ring signature circles 1005 of the ring signature. Furthermore, the inspector interface shows a probability of an individual ring signature circle of the ring signature circles 1005 being a decoy (i.e., probable decoy ring signature circles 1010 are shown with dotted lines) in the ring signature (i.e., the ring signature circles 1005). In some embodiments, each ring signature circle includes a probability of being a decoy with the lower the number the higher the probability of being a decoy.

Figure 11:
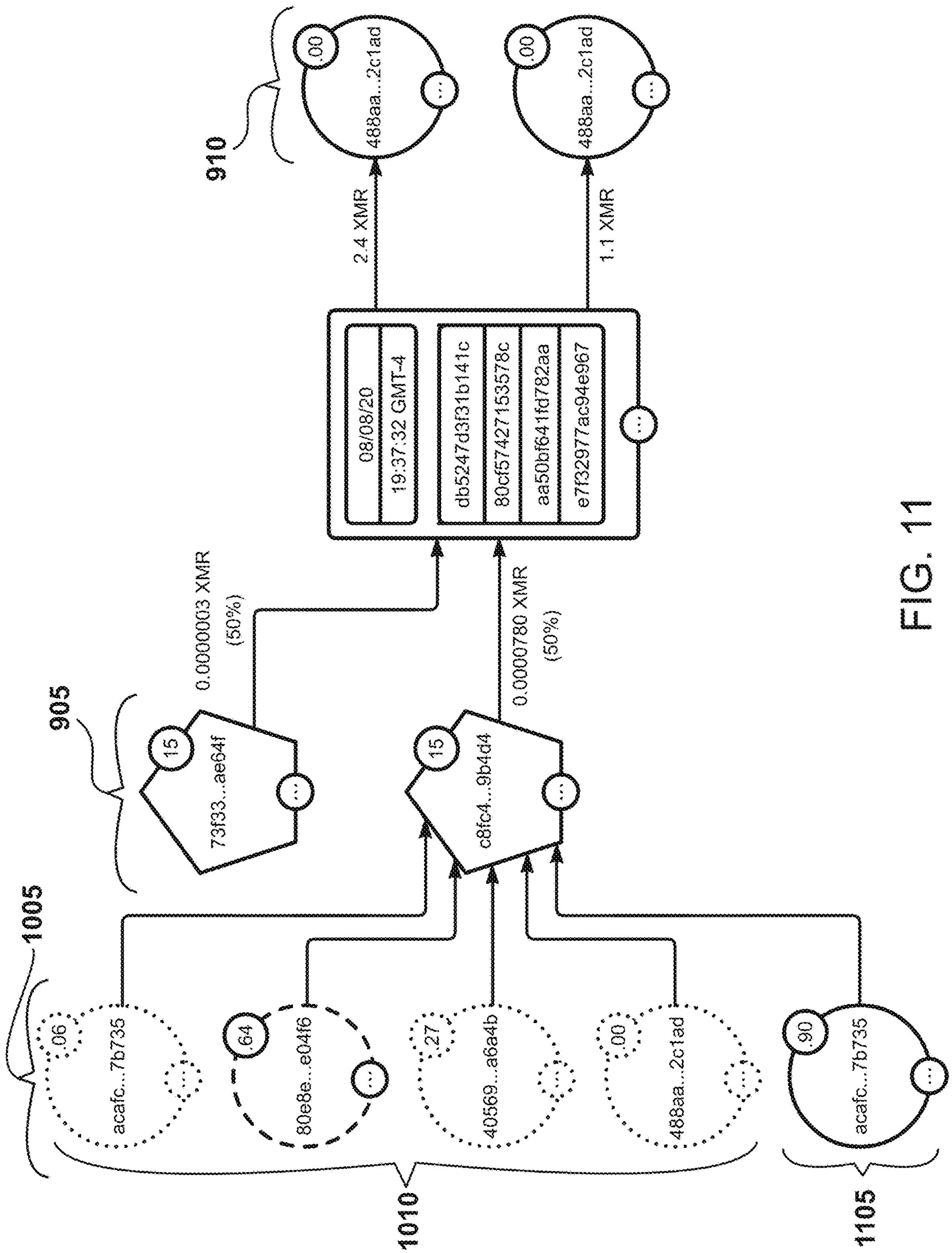
FIG. 11 is a User Interface (UI) of an inspector interface showing a ring signature including a plurality of decoys and a decoy probability for each decoy of the plurality of decoys with a probable spendable and valid input for searching, tracing, and tracking Monero transaction chains, according to exemplary embodiments of the present technology.

FIG. 11 is a User Interface (UI) of an inspector interface showing a ring signature including a plurality of decoys and a decoy probability for each decoy of the plurality of decoys with a spendable and valid input for searching, tracing, and tracking Monero transaction chains, according to exemplary embodiments of the present technology. For example, FIG. 11 shows the ring signature circle 1105 with a "0.90" probability as the least likely of the ring signature circles 1005 of being a decoy. By tracing backwards using the inspector interface, users of the system (e.g., end user(s) 105 including members of law enforcement, financial investigators, regulators, and members of private industry companies who assist these organizations), can track the "origins" of a Monero transaction based on probabilities to determine stolen Monero currencies or Monero currencies used in illegal transactions. The present technology may analyze, at the server computing device, the input of the Monero transaction identification data determining a ring signature (e.g., the ring signature circles 1005) of the input of the Monero transaction identification data, the ring signature (e.g., the ring signature circles 1005) comprising a plurality of decoys and a spendable and valid input (e.g., the ring signature circle 1105) and generate, with a processor, a user interface (e.g., the User Interface (UI) of FIG. 11) displaying the plurality of decoys and the spendable and valid input (e.g., the ring signature circle 1105).

In various embodiments one common transaction on Monero are pool payouts. Pool payouts often send a fixed amount of Monero currency to many different recipients in their pool. Often these will have many different outputs. Because of the way that bulletproofs work, Monero currently has a limit of sixteen outputs. Investigators will often see this kind of transaction and could surmise that this transaction is a pool payout. Another transaction is called a churn, where a Moreno user send funds to themselves to obscure the fact that funds the Moreno user received are going to be later used for another purpose. Churns will often consume a single input and then ideally generate two outputs, one to the user and one to change. Even if Moreno users are very careful about making sure they always have a reasonable number of inputs and outputs to make sure their transactions can hide in the crowd, certain kinds of predictable behavior could make them stand out. If an investigator knows the software that the user is using, or that the specific behavior of a Moreno user may lead to the Moreno user churning a certain number of times, that may imply a certain structure to the transactions of a Monero user that an investigator may be follow up on using the systems and methods for searching, tracing, and tracking Monero transaction chains of the present technology.

Embodiments of the present technology include validation of systems and methods for searching, tracing, and tracking Monero transaction chains for validation purposes. For example, attribution many transactions from CakeWallet to accounts at a variety of Crypto Exchanges, including LATOKEN, MXC, SouthXChange, CoinEx, Bitcoin.com, Crex24, TradeOgre, and BitBNS were completed. These transactions were then matched against the data retrieved from using embodiments of the present technology, proving that systems and methods for searching, tracing, and tracking Monero transaction chains of the present technology are accurate.

Embodiments s of the present technology include Monero data collection tools, to explore more proprietary algorithms to improve probability calculations, link IP addresses to transactions in the future, tackle deanonymizing other aspects of Monero, implement other search methods such as address or payment ID, and discover methods to tie together Monero actions with non-Monero chain activities.

Monero blocks include the following metadata and Monero block metadata comprises the following:

Blob: Hexadecimal block of the block information.

Block Header comprising the following information:

Major Version: the block header parsing rule (i.e., format version) including increments with each block header format update.

Minor Version: the interpretation details that are not related to block header parsing.

Previous Id: Identifier of the previous block (i.e., block hash).

Nonce: 4 byte value which is used in the network consensus algorithm.

Number Of Transactions: The number of transactions contained within this block

Orphan Status: Boolean value, if true—this block is not part of the longest chain.

Reward: amount of new atomic units generated in this block and rewarded to the miner. (Atomic Units are the lowest denomination of XMR).

Timestamp: Unix time at which the block was recorded into the chain.

Height: The number of blocks preceding this block on the blockchain.

Difficulty: The strength of the Monero network based on mining power.

Depth: The number of blocks succeeding this block on the blockchain.

MinerTx: Miner transaction information comprises the following metadata:

Version: Transaction Version Number.

Unlock Time: Block height when the coinbase transaction becomes spendable (this is usually 60 blocks according to CryptoNote MinedMoney Unlock Window).

Vin: List of Transaction Inputs.

Vout: List of transaction Outputs.

Extra: Usually called the "payment id", but can be used to include any random 32 byte/64 character hex string.

Signatures: Contains signatures of the transaction signers. Coinbased transactions do not have signatures.

TxHashes comprise a list of hashes of non-coinbase transactions in the block. If there are no other transactions, the TxHashes will be empty.

Monero transactions have the following components and Monero transaction metadata comprises the following:

Version: Transaction version.

UnlockTime: If not 0, this tells when a transaction output is spendable.

Vin: List of Inputs.

Key: The public key of the previous output spent in this transaction.

Amount: The amount of the input, in Atomic Units.

KeyOffsets: A list of integer offsets to the input.

KeyImage: The key image of the given input.

Vout: List of outputs.

Amount: The amount of the output, in Atomic Units.

Target: Output destination info.

Key: The stealth public key of the receiver.

Extra: Usually called the "payment id," but can be used to include any random 32 byte/64 character hex string.

Signatures: List of signatures used in ring signature to hide the true origin of the transaction.

DoubleSpendSeen: States if the transaction is a double-spend.

InPool: Boolean which states if the transaction is in pool or the block.

The extra field can contain several subfields. To fully read the extra field: this:

Start by reading a single byte:

Tags:

0=padding.

1=the next 32 bytes is the transaction public key.

2=a nonce. VarInt [1] to determine the nonce length. The next byte will be the nonce type.

NonceTypes:

0=32 byte unencrypted payment id.

1=8 byte encrypted payment id.

If there is an encrypted payment ID, then a user needs to compute the shared secret for the transaction in order to decrypt it. This includes scalar multiplication with the private view key and the transaction public key in the "extra"field.

shared_secret=(priv_vk*tx_pk)*8.

decryption_key=keccak256(concat(shared_secret, 0x8d)).

XOR (encrypted_payment_id, decryption_key).

Monero Upgrades include the following:

v2: (block 1009827)—Allow only >=ring size of 3, blocktime=120 seconds, fee-free blocksize 60 kb.

v3: (block 1141317)—Splits coinbase into denominations.

v4: (block 1220516)—Allow normal and RingCT transactions.

v5: (block 1288616)—Adjusted minimum blocksize and fee algo.

v6: (block 1400000)—Allow only RingCT transactions, allow only >=5 ring size.

v7: (block 1546000)—Cryptonight variant 1, ring size >=7, sorted inputs.

v8: (block 1685555)—Max transaction size at half the penalty free blocksize, bulletproofs enabled, cryptonight variant 2, fixed ring size of 11.

v9: (block 1686275)—Bulletproofs required.

v10: (block 1788000)—New PoW based on Cryptonight-R, new block weight algo, slightly more efficient RingCT format.

v11: (block 1788720)—forbid old RingCT format.

v12: (block 1978433)—New PoW based on RandomX, only allow >=2 outputs, change the block median used to calculate penalty, v1 coinbases are forbidden, rct sigs in coinbase are forbidden, 10 block lock time for incoming transactions.

Ring Confidential Transactions (RingCT) comprise the following metadata:

Implemented to hide transaction amounts.

Thus, new transactions do not need to break down different denominations. Therefore, a wallet can pick members from any RingCT outputs.

Ring Signatures cannot include pre-RingCT outputs and RingCT outputs.

pre-RingCT output must first be converted to RingCT before included in Ring Signature.

The Range Proof prevents senders from committing to negative values in order to secure the supply of XMR.

Range Proof cryptographically proves the amounts used in tx is >0 and less than some arbitrary number.

The present technology enables the gathering of the following metadata:

rct_signatures.

The type version.

Fee.

ecdhInfo (Elliptic Curve Diffie Hellman structure) with: mask and amount.

outPk.

Ring Signature comprises the following metadata:

rct_signatures.

ecdhInfo.

Both the ecdhInfo mask and amount are encrypted by the sender of the transaction.

Mask is what hides the amount being transferred in the public commitment. The amount is what the mask is hiding. Both are encrypted in a slightly different way using the transaction's shared secret (aR). Thus, both encrypted values will be randomly distributed, and thus can't be validated by a third party. If the sender had somehow written faulty values in the transaction, the outputs will be unspendable.

outPk. OutPk is the Pedersen Commitments since these can be thought of as a "Public Key".

Prunable RingCT Signature comprises the following metadata:

rctsig_prunable comprising the following meatadata:

The range signatures used for the proof.

The actual bulletproofs.

MGs (which correspond to the necessary keys to represent MLSAG sigs).

MLSAG is an acronym for "Multi-Layered Linkable Spontaneous Anonymous Group."

These are signature types that are used by Shen Noether's Ring CT based on Gregory Maxwell's CT and Nicholas van Saberhagen's Ring Signatures.

TL;DR: it allows for the combining of confidential transactions with a ring signature in such a way that using multiple inputs and outputs is possible, anonymity is preserved, and double spending is prevented.

The parser can collect all "containers" necessary for the actual RingCT:

CTKey (dest and mask (C here if public).

If it's representing a private ctkey then "dest" contains the secret key of the address while "mask" contains a where (C=aG+bH) is the CT pedersen commitment and b is the amount.

If it's representing a public CTKey, then "dest"=P the address, mask=C the commitment.

MultiSig: Key's (k, L, R, ki).

mgSig: Contains the necessary keys to represent MLSAG.

keys: ss, cc, II.

rangeSig: Contains the data for an Borromean sig which also contains the "Ci" values such that: sum Ci=C. The sig proves that each Ci is either a Pedersen commitment to 0 or to 2^i thus proving that C is in the range of [0, 2^64]

params are: asig and Ci.

All params of the bulletproof itself.

A, S, T1, T2, taux, mu, L, R, a, b, t.

And, pseudoOuts which is purely the commitment for simple ringCT.

Vulnerabilities in Monero Distributed Ledger Data include the following:

Pre-RingCT zero mixin transactions—exposed to UTXO analysis and clustering.

Coinbase transactions—never have amounts hidden, miner spending may be traced.

Reuse of non-stealth public keys—exposes actual blockchain addresses without possession of associated viewkeys.

Usage of payment IDs—opportunity to group transactions as belonging to the same party.

Transactions before activation of the new 50/50 mixin sampling algorithm—real input is the newest unspent output in 80 percent of the cases.

Same mixins used my multiple ring signatures may be identified as decoys in most of the cases.

Standard 11 mixins/2 outputs RingCT transactions-spend and change outputs could be distinguished through propagation analysis.

IP address clustering. For example, transactions submitted by the same IP address may attributed to a single owner. Differences between the Peer-to-Peer (P2P) Monero transaction relay network and BitCoin relay network include the following:

Fluffy Blocks (Compact). Test network graph.

P2P/SPV Segregated. All EndPts: wallet2.cpp.

POW allows Pay-RPC. invest→pwn.

Harder Tracing→More Logging. SSL, Node ID.

Light Clients: off P2P.

The following are examples of data that a node may log include the following:

Levin Protool: P2P and CryptoNote.

P2P (1001-1007).

SSL Key.

Network state.
Node ID.
Flags/protocol version.
CryptoNote (2001-2009)
Tx relay.
Chain, block notifications, and object requests.
Core RPC: Everything else:
Wallet, Mining.
Usually private; LAN authorit.
View keys.
Decoy service,
Get blocks.
Anything mining-related.
Pay RPC uses Core RPC.

Monero Modifications for the systems and methods of the preset technology include the following:

Gingerballs/Monero: commit 93f3c68.
Draft PR: feature/dandelionpp←feature/ct-logging.
Each line: 'MONP2PLOG:' +JSON {cmd, context, request}.
Regular logging→Kafka via k8s.
Includes all context vars→fewer data merges needed.
Plumbing of P2P/CN msgs:
contrib/epee/include/storages/levin_abstract_invoke2.h
src/cryptonote_protocol/cryptonote_protocol_handler.h
src/p2p/net_node.h
Actual Logging Fons separated.
Full Context:
Session ID.
Internal State.
Min. Contact.
=Min. Conflict.
Add RPC Logging.
Anticipate using Pay RPC.
View Key, Decoy Service.
Build takes forever.
New CMake target daemon+.
Remove CI build checks for irrelevant platforms.
Quicker Test Loop.
Python test suite using py-levin etc.
Filter Kitchen Sink Approach for Relevance.
Currently Logs contain.
Command Code int (1001-1007, 2001-2009).
(25 Context Variables) and (Request Payload JSON).

Dandelion Protocol for Monero Mechanism for Tracing

The Dandelion protocol is a network layer anonymity solution that was originally proposed in 2017 to help improve on Bitcoin's P2P network privacy P2P Network Communication includes the following:

Gossip protocol, send transactions to all peers, diffusion (timing attacks but susceptible to deanonymization attacks, including exponential and independent back off, and linking IP address to transactions.

Dandelion Protocol includes the stem phase and the bloom (fluff) phase. During the stem phase, time divided into epochs and in each epoch two random outgoing connections are picked. Furthermore, for a transaction, pick one out of the two random outgoing connections and send the TX on that link and on relay others pick either one of the two random outgoing connections. In contrast, during the Bloom (fluff) phase, transactions are sent to all.

Non-deterministic algorithms based on random simulation (e.g., Monte Carlo Tree Search (MTCS)).

Currently, Monero transactions (TXs) have three key privacy features including the followings: first Ring Size—of the inputs and outputs recorded only a small number (1-2/11) are real; second Amounts Hidden—whether it is RingCT or bulletproof the amount of XMR in a TX is hidden; third one-time addresses (i.e., one-time "public" addresses) are never reused.

Embodiments of the present technology use a "Probabilistic Network Analysis" is the general area of using probability theory and the recorded network of inputs and outputs to defeat the above three privacy features and t search, trace, and track transaction-chains through the "spaghetti" of fake inputs and outputs, and assign probable amounts as described herein.

Motif Detection

Overview of Theory

The Monero network may randomly choose its decoys, but human interaction networks are much less random. For example, two users may send money back and forth to one another. Looking forward from the first transaction between onetime addresses A and B, the trees of possible outputs should interact more with each other, if they are sending money back and forth, and hold most of their funds in a small number of IP addresses. For instance, consider the set of past addresses (a, b, c, . . . ) an apparent output A has, all the way back to the coinbase transactions where those coins were mined. Weight each by how many transactions (TX) ago it was: History (A)=(1: a, 1: b, 2: c, . . . 33: zz, 33: zza, . . . )—there are a few well-defined ways to quantify the p-value: chance that this weighted set would have an overlap with another weighted set due to chance alone. Say the other set is: History (B)=(1: www, 2: b, 2: bbb, . . . 24: zz, 25: zzffg, . . . ). All of the p-values come down to a function of "how many things could have been shared" vs "how many things were shared." Therefore, for the above A∩B contains {b: (2,2), zz: (33,24), history (b), history (zz)} as an overlap: 33 transactions ago for A and 24 ago for B, they both had outputs from zz. Similarly, 2 transactions ago they both had outputs from b. Of course, this (huge) set also includes the common histories of both zz and b. But zz and b can be identified as the "greatest common denominator"/"most recent common ancestor" of the two trees, called a meet in the mathematics of partially ordered sets. If the algorithm used is known when the mixins (i.e., output and input decoys and real I/O) are generated, the present technology enables calculation of the probability that a certain number of distinct meets would be shared by these trees—the further back the bigger the umbrella and the more likely to happen by chance, etc. The exact details of the calculation depend on which algorithm was being used, how many inputs were available to mixin to the ring signature, etc. at the time of the transaction. But these are public knowledge with timestamps published of when the changes to algorithms, ring sizes etc. occurred.

Practical Considerations.

Calculating this on the fly would be prohibitively expensive. But the present technology immediately uses two advantageous tools. First, pre-calculating set histories and storing them in a bloom filter. Second, dynamic programming techniques. The first (pre-calculating set histories and storing them in a bloom filter) allows the present technology to store enough information about the history of a onetime address in a small hash table that cheaply determines when overlap is too small and to look more closely at when possible, and the present technology focus on the pairs that might have significant interaction. The second (Dynamics programming techniques) enables the present technology to avoid having to recalculate the same quantity with small differences many times, when computing the actual likelihood of an interaction. There could of course be different network motifs-maybe A and B both interact a lot with C. Maybe A sends to B repeatedly. Maybe they send back and forth. Figuring out how to factor in these different patterns is a matter of experience and testing for enabling the present technology. For example, the present technology incldues the following analysis:

(i) Take some interaction models: Owner (A)<-->Owner (B), Owner (A)--->Owner (B) for starters.
(ii) Generate transaction chains that instantiate these models as skeletons using one-time addresses.
(iii) Mixin the appropriate number of spurious I/O from some larger set.
(iv) Run a motif finder based on weighted set interaction on (iii) and see if/when it can recover the real tx chain from (ii).
(v) Heuristics for identifying the behavior model (i) from the skeleton Success Conditions.

Performing an O(N**2) algorithm on every TX is prohibitive. However, if the present technology topologically sorts first (linear: O(3*Tx+11*Inputs)), computing a sum-product between two given nodes reduces to O(dN) where dN is the number of nodes between the first TX and the later TX. This corresponds to indexing on transaction time, with a subindex of TX order within a block (the "time preorder"), and each TX having links into a TX that contain its outputs as mixins. Multi-input transactions have a different topology than single-input transactions, and the present technology uses this advantageously. Regarding the metric for interacting trees. The present technology is interested in trees rooted on MI Tx (e.g., fanning backward or forward from a MI TX), which reduces the number of trees that need to consider by approximately two to three time.

Example Monte Carlo Tree Search (MTCS)

A first TX address below has two input ring signatures each with eleven mixins.

A first TX address: "https://Moneroblocks.info/tx/a6fb25a449aa61cf3c8ed96afc397bd1bf4bc55a06c9a-48de5e0 186582a3cf02"

The second TX address below has one input ring signature with eleven mixins.

A second TX address: "https://Moneroblocks.info/tx/cfc4clde0e3dc70ec4828c730795ea663fe89efd02271c-227577 f29b42"

The logic is that the first TX address is an RCT type simple TX with two real inputs. The second TX is a RCT Type Full TX with a single real input. The Bulletproof spec shows you can still identify MI Tx vs. SI Tx in types Bulletproof and Buletproof2; shows sample TX.

The description below assists with accepting or rejecting heuristics for a Monte Carlo Tree Search (MTCS):

The present technology enables the following:

Public keys within each input belong to the same user only with random chance.

One of the public keys in the first input of the Simple TX belongs to the same user as one of the public keys in the second input of the same TX.

So when a full output is actually spent in a simple input, its value is more heavily constrained.

Within the tree of a MI TX, the value inequality is the same as the time preorder.

For a single input (Full, or Bulletproof) the present technology enables the following:

Real_In=Out1+Out2, (e.g.: Real_In >max (Out1, Out2))

At a MI Tx, the value inequality is opposite that of the time preorder in a certain way.

For the multi-input (Simple) the present technology enables the following:

Real_In1+Real_In2=Out1+Out2, and also: Real_In1<max (Out1, Out2), Real_In2<max (Out1, Out2). Note the different direction of inequality, if the present technology is concerned about the max. For chains of Full TX, the > composes (becoming ≥ if one out). For chains of Simple, the <composes. For example, the above inequalities may be used as success conditions for Monte Carlo Tree Search (MTCS): techniques descried herein. For example, given a distribution of accumulated input values from pre RingCT (i.e., summing over all the coin denominations) and the initial conditions of input value, the present technology compares the probability that the total input value is within a given range, given by the inequalities at the multi-input. Furthermore, the present technology may also reject any inconsistencies outright (inconsistencies will be hard to find without special knowledge).

Figure 12:
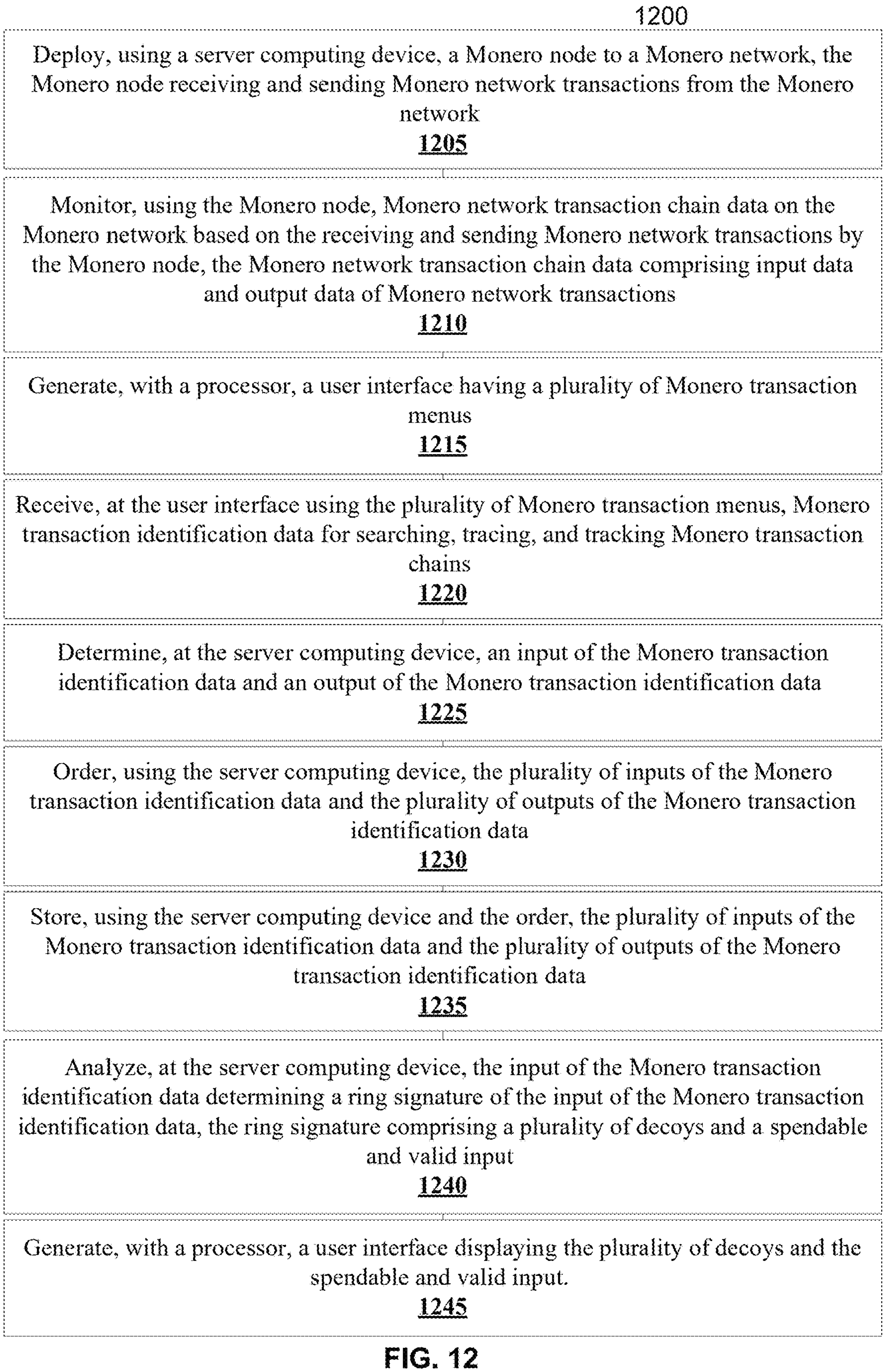
FIG. 12 is an exemplary computer implemented method for searching, tracing, and tracking Monero transaction chains comprising, according to exemplary embodiments of the present technology.

FIG. 12 is an exemplary computer implemented method for searching, tracing, and tracking Monero transaction chains comprising, according to exemplary embodiments of the present technology. The computer implemented method 1200 for searching, tracing, and tracking Monero transaction chains comprising: deploying 1205, using a server computing device, a Monero node to a Monero network, the Monero node receiving and sending Monero network transactions from the Monero network. The computer implemented method 1200 may proceed with monitoring 1210, using the Monero node, Monero network transaction chain data on the Monero network based on the receiving and sending Monero network transactions by the Monero node, the Monero network transaction chain data comprising input data and output data of Monero network transactions. The computer implemented method 1200 may continue with generating 1215, with a processor, a user interface having a plurality of Monero transaction menus. Next, the computer implemented method 1200 may proceed with receiving 1220, at the user interface using the plurality of Monero transaction menus, Monero transaction identification data for searching, tracing, and tracking Monero transaction chains. The computer implemented method 1200 may continue with determining 1225, at the server computing device, an input of the Monero transaction identification data and an output of the Monero transaction identification data. The computer implemented method 1200 may continue with ordering 1230, using the server computing device, the plurality of inputs of the Monero transaction identification data and the plurality of outputs of the Monero transaction identification data. Next, the computer implemented method 1200 may proceed with storing 1235, using the server computing device and the order, the plurality of inputs of the Monero transaction identification data and the plurality of outputs of the Monero transaction identification data. The computer implemented method 1200 may continue with analyzing 1240, at the server computing device, the input of the Monero transaction identification data determining a ring signature of the input of the Monero transaction identification data, the ring signature comprising a plurality of decoys and a spendable and valid input; and generating 1245, with a processor, a user interface displaying the plurality of decoys and the spendable and valid input.

For example, order all inputs and outputs may be done by (e.g., block, tx, pos, io, pos) with outputs coming first.

Moreover, the store the entire DAG state as a bit-array using this ordering with one ne bit per potential state. For instance, for Outputs 1 marks "chosen change address" and 0 marks "chosen destination". Furthermore, for Pre-RCT logic based on Tx amounts may be used to determine what combinations are legal, and use MCTS to pick among them. Furthermore, during RCT either output could be a change, embodiments may guess, and use MCTS (e.g., subsequent simulations to score the guesses). Furthermore, for Inputs, 1 marks "chosen real spend" and 0 marks "chosen decoy".

Figure 13:
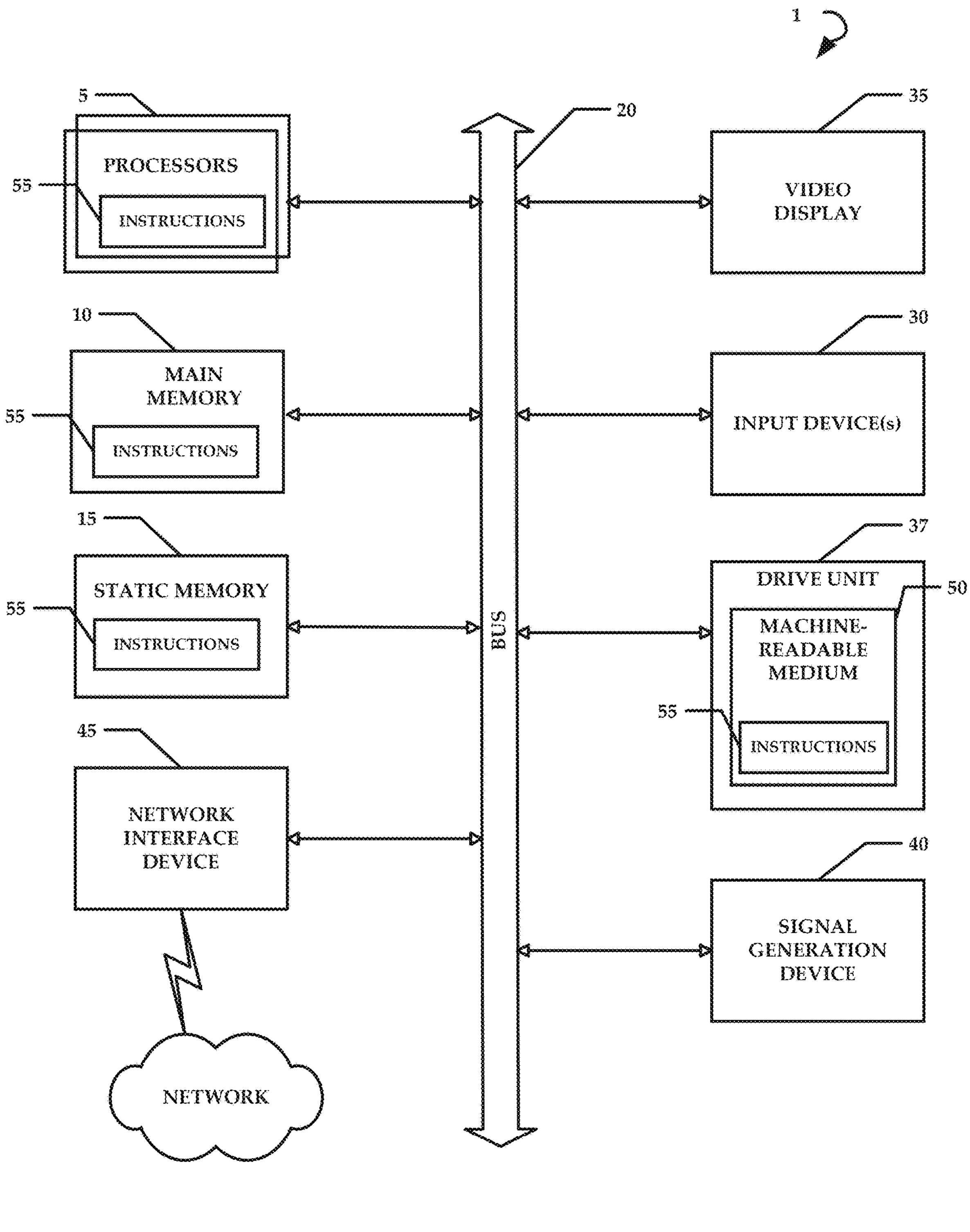
FIG. 13 illustrates an exemplary computer system that may be used to implement embodiments of the present technology.

FIG. 13 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A computer program product comprising a non-transitory computer useable storage device having a computer readable program, wherein the computer readable program when executed on a server computing device causes the server computing device to:

deploy, using the server computing device, a Monero node to a Monero network, the Monero node receiving and sending Monero network transactions from the Monero network;

monitor, using the Monero node, Monero network transaction chain data on the Monero network based on the receiving and sending Monero network transactions by the Monero node, the Monero network transaction chain data comprising input data and output data of Monero network transactions;

generate, with a processor, a user interface having a plurality of Monero transaction menus;

receive, at the user interface using the plurality of Monero transaction menus, Monero transaction identification data for searching, tracing, and tracking Monero transaction chains;

determine, at the server computing device, an input corresponding to the Monero transaction identification data;

analyze, at the server computing device, the input of the Monero transaction identification data;

based on the analyzing, determining, by the processor, a ring signature of the input of the Monero transaction identification data, the ring signature comprising a plurality of inputs, the plurality of inputs comprising a plurality of decoy inputs and a non-decoy input, the non-decoy input being a spendable and valid input;

analyze, by the processor using the Monero network transaction chain data, the plurality of inputs for determining a decoy probability for each of the plurality of inputs, the decoy probability being a numeric probability value that represents a likelihood that an input of the plurality of inputs is the non-decoy input and not one of the plurality of decoy inputs; and generate, with the processor, a user interface displaying:

the ring signature including the plurality of inputs associated with the Monero network transactions; and for each of the plurality of inputs, a corresponding probability that the input is the non-decoy input and not one of the plurality of decoy inputs.

2. The computer program product of claim 1, wherein the server computing device is further caused to:

order, using the server computing device, a plurality of inputs of the Monero transaction identification data and a plurality of outputs of the Monero transaction identification data;

store, using the server computing device and the order, the plurality of inputs of the Monero transaction identification data and the plurality of outputs of the Monero transaction identification data, wherein the order, using the server computing device, the plurality of inputs of the Monero transaction identification data and the plurality of outputs of the Monero transaction identification data comprises placing the plurality of outputs of the Monero transaction identification data before the plurality of inputs of the Monero transaction identification data.

3. The computer program product of claim 2, wherein the store, using the server computing device, the plurality of inputs of the Monero transaction identification data and the plurality of outputs of the Monero transaction identification data uses a bit array with one bit per potential state.

4. The computer program product of claim 1, wherein Monero is a decentralized cryptocurrency.

5. The computer program product of claim 4, wherein the determining the decoy probability for each of the plurality of inputs comprises: non-deterministic algorithms based on random simulation.

6. The computer program product of claim 4, wherein the determining the decoy probability for each of the plurality of inputs comprises: using optimization algorithms on a Bayesian Network.

7. The computer program product of claim 4, wherein the server computing device is further caused to identify the non-decoy input based on a corresponding probability.

8. The computer program product of claim 7, wherein the server computing device is further caused to receive, at the user interface, user input data indicating the Monero transaction identification data for searching, tracing, and tracking Monero transaction chains was used in an illegal transaction.

9. The computer program product of claim 8, wherein the server computing device is further caused to send the user input data indicating the Monero transaction identification data for searching, tracing, and tracking Monero transaction chains was used in an illegal transaction to a Monero related Virtual Asset Service Provider (VASP).

10. A computer program product comprising a non-transitory computer useable storage device having a computer readable program, wherein the computer readable program when executed on a server computing device causes the server computing device to:

receive, using the server computing device, Monero network transactions from a Monero node, the Monero node being a third-party Monero node associated with a Monero network;

monitor, using the Monero node, Monero network transaction chain data on a Monero network based on the Monero network transactions from the Monero node, the Monero network transaction chain data comprising input data and output data of Monero network transactions;

generate, with the server computing device, a user interface having a plurality of Monero transaction menus;

receive, at the user interface using the plurality of Monero transaction menus, Monero transaction identification data for searching, tracing, and tracking Monero transaction chains;

determine, by the server computing device, an input corresponding to the Monero transaction identification data;

analyze, by the server computing device, the input of the Monero transaction identification data;

based on the analyzing, determining, by the server computing device, a ring signature of the input of the Monero transaction identification data, the ring signature comprising a plurality of inputs, the plurality of inputs comprising a plurality of decoy inputs and a non-decoy input, the non-decoy input being a spendable and valid input;

analyze, by the server computing device, using the Monero network transaction chain data, the plurality of inputs for determining a decoy probability for each of the plurality of inputs, the decoy probability being a numeric probability value that represents a likelihood that an input of the plurality of inputs is the non-decoy input and not one of the plurality of decoy inputs; and generate, with the server computing device, a user interface displaying:

the ring signature including the plurality of inputs associated with the Monero network transactions; and for each of the plurality of inputs, a corresponding probability that the input is the non-decoy input and not one of the plurality of decoy inputs.

11. A computer implemented method for searching, tracing, and tracking Monero transaction chains comprising:

deploying, using a server computing device, a Monero node to a Monero network, the Monero node receiving and sending Monero network transactions from the Monero network;

monitoring, using the Monero node, Monero network transaction chain data on the Monero network based on the receiving and sending Monero network transactions by the Monero node, the Monero network transaction chain data comprising input data and output data of Monero network transactions;

receiving Monero transaction identification data for searching, tracing, and tracking Monero transaction chains;

determining, at the server computing device, an input corresponding to the Monero transaction identification data;

analyzing, at the server computing device, the input of the Monero transaction identification data;

based on the analyzing, determining a ring signature of the input of the Monero transaction identification data, the ring signature comprising a plurality of inputs, the plurality of inputs comprising a plurality of decoy inputs and a non-decoy input, the non-decoy input being a spendable and valid input;

analyzing, using the Monero network transaction chain data, the plurality of inputs for determining a decoy probability for each of the plurality of inputs, the decoy probability being a numeric probability value that represents a likelihood that an input of the plurality of inputs is the non-decoy input and not one of the plurality of decoy inputs; and generating a user interface displaying;

the ring signature including the plurality of inputs associated with the Monero network transactions; and for each of the plurality of inputs, a corresponding probability that the input is the non-decoy input and not one of the plurality of decoy inputs.

12. The computer implemented method of claim 11, further comprising:

ordering, using the server computing device, the plurality of inputs of the Monero transaction identification data and a plurality of outputs of the Monero transaction identification data;

storing, using the server computing device and the order, the plurality of inputs of the Monero transaction identification data and the plurality of outputs of the Monero transaction identification data, wherein the ordering, using the server computing device, the plurality of inputs of the Monero transaction identification data and the plurality of outputs of the Monero transaction identification data comprises placing the plurality of outputs of the Monero transaction identification data before the plurality of inputs of the Monero transaction identification data.

13. The computer implemented method of claim 12, wherein the storing, using the server computing device, the plurality of inputs of the Monero transaction identification data and the plurality of outputs of the Monero transaction identification data uses a bit array with one bit per potential state.

14. The computer implemented method of claim 11, wherein Monero is a decentralized cryptocurrency.

15. The computer implemented method of claim 14, wherein the determining the decoy probability for each of the plurality of inputs comprises: non-deterministic algorithms based on random simulation.

16. The computer implemented method of claim 14, wherein the determining the decoy probability for each of the plurality of inputs comprises: using optimization algorithms on a Bayesian Network.

17. The computer implemented method of claim 14, further comprising:

displaying, on the user interface, the corresponding probability as a percentage that the input is the non-decoy input and not one of the plurality of decoy inputs.

18. The computer implemented method of claim 11, further comprising receiving, at the user interface, user input data indicating the Monero transaction identification data for searching, tracing, and tracking Monero transaction chains was used in an illegal transaction.

19. The computer implemented method of claim 18, further comprising:

sending the user input data indicating the Monero transaction identification data for searching, tracing, and tracking Monero transaction chains was used in an illegal transaction to a Monero related Virtual Asset Service Provider (VASP).

* * * * *